(12) United States Patent
Ozaki et al.

(10) Patent No.: US 11,722,726 B2
(45) Date of Patent: Aug. 8, 2023

(54) TELEVISION APPARATUS AND DISPLAY METHOD

(71) Applicants: Hisense Visual Technology Co., Ltd., Shandong (CN); TVS REGZA Corporation, Aomori (JP)

(72) Inventors: Satoshi Ozaki, Aomori (JP); Satoru Ema, Aomori (JP); Masataka Tsunemi, Aomori (JP)

(73) Assignees: Hisense Visual Technology Co., Ltd., Shandong (CN); TVS REGZA Corporation, Aomori (JP)

( * ) Notice: Subject to any disclaimer, the term of this patent is extended or adjusted under 35 U.S.C. 154(b) by 0 days.

(21) Appl. No.: 17/821,062

(22) Filed: Aug. 19, 2022

(65) Prior Publication Data

US 2022/0408148 A1 Dec. 22, 2022

Related U.S. Application Data

(63) Continuation of application No. PCT/CN2021/077470, filed on Feb. 23, 2021.

(30) Foreign Application Priority Data

Jun. 2, 2020 (JP) ................................ 2020-096368
Jul. 29, 2020 (JP) ................................ 2020-128522

(51) Int. Cl.
*H04N 21/43* (2011.01)
*H04N 21/222* (2011.01)
(Continued)

(52) U.S. Cl.
CPC ..... *H04N 21/43076* (2020.08); *H04N 21/222* (2013.01); *H04N 21/237* (2013.01);
(Continued)

(58) Field of Classification Search
CPC ........... H04N 21/43076; H04N 21/222; H04N 21/237; H04N 21/2542; H04N 21/25816;
(Continued)

(56) References Cited

U.S. PATENT DOCUMENTS 8,627,438 B1 * 1/2014 Bhimanaik ............. H04L 63/08
726/9
9,965,800 B1 * 5/2018 Pitstick .............. G06Q 30/0643
(Continued)

FOREIGN PATENT DOCUMENTS

| CN | 103207668 A | 7/2013 |
|---|---|---|
| CN | 105320482 A | 2/2016 |

(Continued)

OTHER PUBLICATIONS

Japanese Office Action, dated Nov. 22, 2022, Japanese App. No. 2020-096368.
(Continued)

*Primary Examiner* — James R Sheleheda
(74) *Attorney, Agent, or Firm* — Workman Nydegger

(57) ABSTRACT

Disclosed are a television apparatus and a display method. The television apparatus includes a display configured to display an image, a communication interface configured to communicate with a mobile device and one or more servers, and a controller in connection with the display and the communication interface. The controller is configured to receive authentication information from a second server of the one or more servers, display the authentication information on the display of the display apparatus, receive a display request for displaying an item in actual physical size from the second server, and display the item in actual physical size on the display of the television apparatus.

20 Claims, 21 Drawing Sheets

(51) Int. Cl.
*H04N 21/237* (2011.01)
*H04N 21/254* (2011.01)
*H04N 21/258* (2011.01)
*H04N 21/27* (2011.01)
*H04N 21/41* (2011.01)
*H04N 21/478* (2011.01)
*H04N 21/858* (2011.01)

(52) U.S. Cl.
CPC ... *H04N 21/2542* (2013.01); *H04N 21/25816* (2013.01); *H04N 21/27* (2013.01); *H04N 21/4126* (2013.01); *H04N 21/47815* (2013.01); *H04N 21/8586* (2013.01)

(58) Field of Classification Search
CPC .............. H04N 21/27; H04N 21/4126; H04N 21/47815; H04N 21/8586
See application file for complete search history.

(56) References Cited

U.S. PATENT DOCUMENTS

| | | | |
|---|---|---|---|
| 11,134,316 B1* | 9/2021 | Pavlosky | H04N 21/47815 |
| 2005/0102227 A1* | 5/2005 | Solonchev | G06Q 30/06 705/26.1 |
| 2009/0009511 A1 | 1/2009 | Ueda et al. | |
| 2009/0172780 A1* | 7/2009 | Sukeda | H04N 21/41265 726/3 |
| 2009/0278861 A1* | 11/2009 | Price | G06Q 30/0283 705/14.69 |
| 2011/0007901 A1* | 1/2011 | Ikeda | H04B 5/02 380/270 |
| 2012/0117590 A1* | 5/2012 | Agnihotri | H04N 21/441 725/30 |
| 2012/0138671 A1* | 6/2012 | Gaede | G06F 16/9554 235/375 |
| 2013/0019296 A1* | 1/2013 | Brandenburg | G06Q 30/02 726/7 |
| 2013/0188095 A1* | 7/2013 | Hartson | H04N 21/4126 348/589 |
| 2013/0194238 A1* | 8/2013 | Sakai | G06F 3/0304 345/175 |
| 2014/0079374 A1* | 3/2014 | Gehring | G06F 16/9554 725/38 |
| 2014/0366055 A1* | 12/2014 | Murakami | H04N 21/41265 725/30 |
| 2015/0170209 A1* | 6/2015 | Smith | G06Q 30/0267 705/14.64 |
| 2017/0042416 A1* | 2/2017 | Carrafa | A61B 3/032 |
| 2017/0124636 A1* | 5/2017 | Qi | G06V 20/20 |
| 2017/0272824 A1* | 9/2017 | Bunner | H04W 76/14 |
| 2018/0181997 A1* | 6/2018 | Sanjeevaiah Krishnaiah | H04L 67/53 |
| 2018/0367850 A1* | 12/2018 | Kageyama | H04N 21/278 |
| 2020/0160430 A1 | 5/2020 | Lamoureux | |
| 2021/0035166 A1* | 2/2021 | Doumar | H04W 4/80 |
| 2022/0116676 A1* | 4/2022 | Wang | H04N 21/4126 |
| 2022/0321244 A1* | 10/2022 | Fairchild | H04H 60/47 |
| 2022/0408148 A1* | 12/2022 | Ozaki | H04N 21/222 |

FOREIGN PATENT DOCUMENTS

| | | |
|---|---|---|
| CN | 106652006 A | 5/2017 |
| JP | 2009017279 A | 1/2009 |
| JP | 2018072293 A | 5/2018 |
| JP | 2018077747 A | 5/2018 |
| WO | WO-2022062331 A1 * | 3/2022 |

OTHER PUBLICATIONS

Japanese Search Report, search date Sep. 28, 2022, from Japanese App. No. 2020-096368.

International Search Report, dated May 11, 2021, from PCT Application PCT/CN2021/077470.

* cited by examiner

| TVID | Authentication code | EC website ID | Token |

| Image ID | EC website ID | Terminal ID |
|---|---|---|
| — | — | — |

| Image | EC website ID | Terminal ID | TV ID | Picture size | Resolution |
|---|---|---|---|---|---|
| — | — | — | — | — | — |

| EC website name | EC website ID | Terminal ID | Terminal type | Log | TV manufacturer name | Model name | TV ID | Picture size | Resolution |
|---|---|---|---|---|---|---|---|---|---|
| — | — | — | — | — | — | — | — | — | — |

FIG.24

TELEVISION APPARATUS AND DISPLAY METHOD

CROSS-REFERENCE OF RELATED APPLICATIONS

The application is a continuation application of International Application No. PCT/CN2021/077470 filed Feb. 23, 2021, which claims the priorities from Japanese Patent Application No. 2020-128522 filed on Jul. 29, 2020 and Japanese Patent Application No. 2020-096368 filed on Jun. 2, 2020, which are hereby incorporated by reference in their entireties.

TECHNICAL FIELD

The disclosure relates to a television apparatus, a server management device and system.

BACKGROUND

In recent years, there is a technology in which a receiver device and a terminal device cooperate to send and receive information. For example, the receiver device sends information received from a webpage to the terminal device. Patent Document 1: Japanese Invention Patent No. 5898431.

SUMMARY

However, the screen of a terminal device is not large enough in many scenarios, so that it is difficult for the user to imagine the size of the image displayed on the terminal device.

Therefore, in view of the above issue, the disclosure is to provide a server device, a television apparatus, a server management device and system, to cause the image displayed on the terminal to be shown on the apparatus with a larger image than the screen of the terminal device.

The disclosure provides a television apparatus, including a display configured to display an image, a communication interface configured to communicate with a mobile device and one or more servers, and a controller in connection with the display and the communication interface. The mobile device is configured to communicate with a first shopping website server of the one or more servers and comprises a camera, the one or more servers include a second server for pushing and distributing information to the display apparatus. the controller is configured to: receive authentication information from the second server, where the authentication information includes URL information for determining the first shopping website server and an authentication code for authentication between the first shopping website server and the second server; display the authentication information on the display of the display apparatus in order to allow the mobile device to scan the authentication code to access the first shopping website server based on the URL information for determining the first shopping website server and send the authentication code to the first shopping website server for authentication between the first shopping website server and the second server, to cause the second server generate a token and send the token to the first shopping website server; receive a display request for displaying an item in actual physical size from the second server, where the display request is associated with a display request from the mobile device, the token and URL information for pointing to the item from the first shopping website server; and display the item in actual physical size on the display of the television apparatus.

The disclosure provides a display method on a television apparatus. The television apparatus includes a display configured to display an image, a communication interface configured to communicate with a mobile device and one or more servers, and a controller in connection with the display and the communication interface. The mobile device is configured to communicate with a first shopping website server of the one or more servers and comprises a camera, the one or more servers include a second server for pushing and distributing information to the display apparatus. The display method includes: receiving authentication information from the second server, where the authentication information includes URL information for determining the first shopping website server and an authentication code for authentication between the first shopping website server and the second server; displaying the authentication information on the display of the display apparatus in order to allow the mobile device to scan the authentication code to access the first shopping website server based on the URL information for determining the first shopping website server and send the authentication code to the first shopping website server for authentication between the first shopping website server and the second server, to cause the second server generate a token and send the token to the first shopping website server; receiving a display request for displaying an item in actual physical size from the second server, where the display request is associated with a display request from the mobile device, the token and URL information for pointing to the item from the first shopping website server; and displaying the item in actual physical size on the display of the television apparatus.

BRIEF DESCRIPTION OF THE DRAWINGS

FIG. 24 shows a diagram of an example of DB data in the third embodiment.

DESCRIPTION OF REFERENCE SIGNS 1, 1': Smartphone; 2, 2': Television apparatus; 3: server for pushing and distribution; 4, 4': EC website server; 5: General-purpose server; 6: Measurement server; 3': Display control server; 5': Charging server; S, S': system.

DETAILED DESCRIPTION

Hereinafter, the embodiments (first embodiment, second embodiment, third embodiment, fourth embodiment, and variants) of the server device, broadcast receiving apparatus, server management device and system of the disclosure will be described in detail with reference to the accompanying drawings.

First Embodiment

Figure 1:
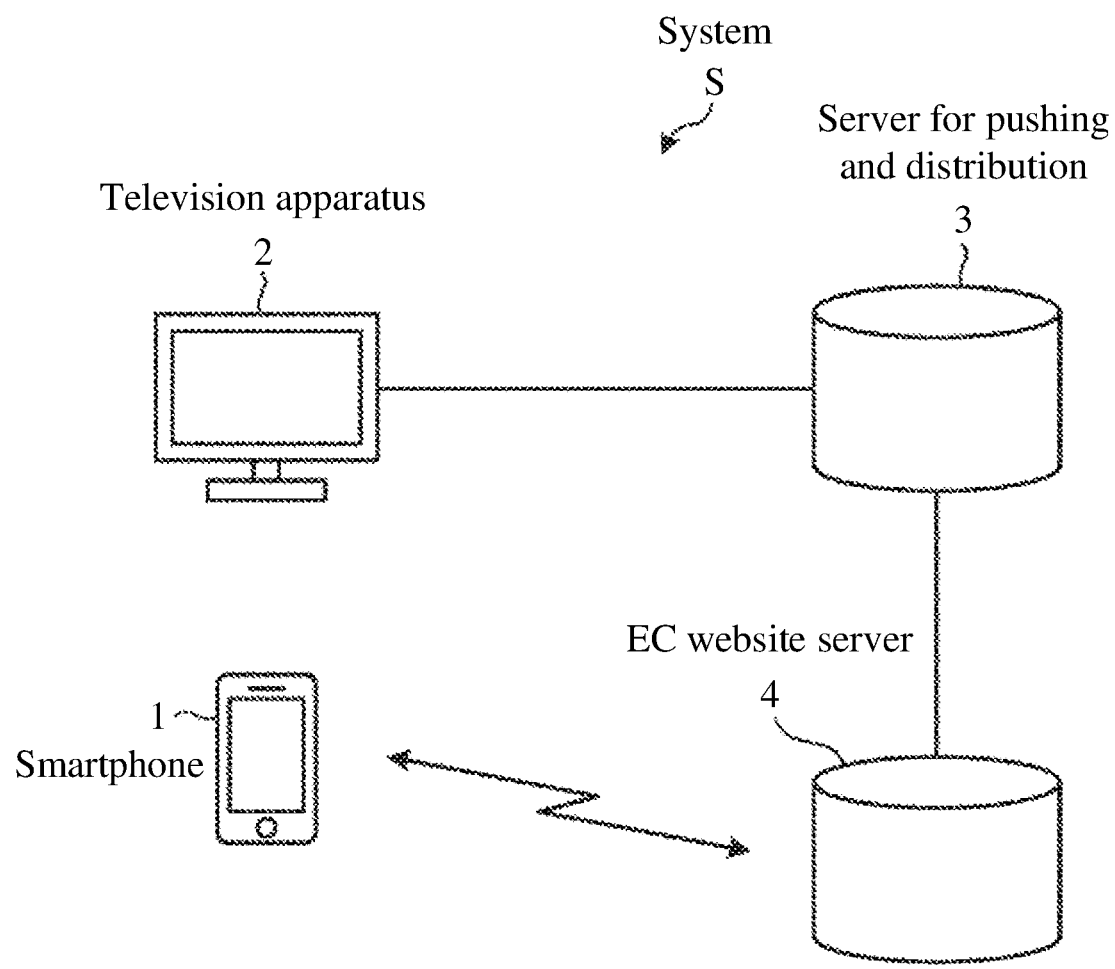
FIG. 1 shows a schematic diagram of an example of the overall structure of a system in a first embodiment.

Firstly, an example of the overall structure of the system S in the first embodiment will be described with reference to FIG. 1. FIG. 1 shows a schematic diagram of an example of the overall structure of the system S in the first embodiment. The system S includes a smartphone 1 (terminal), a television apparatus 2 (broadcast receiving apparatus), a server for pushing and distribution 3 (server device), and an EC (Electronic Commerce) website server 4. The server 3 can communicate with the television apparatus 2 and the EC website server 4 through a public communication network such as Internet. Furthermore, the smartphone 1 can wirelessly communicate with the EC website server 4 and the server for pushing and distribution 3 through a base station.

The smartphone 1 is an example of an information terminal of a user who also uses the television apparatus 2. The smartphone 1 has a communication interface I/F, an audio input component (microphone), a group of sensor, a display component, a graphics controller, a touch panel controller, a CPU (Central Processing Unit), a memory, a camera and a speaker, etc. In the first embodiment, it is assumed that the user performs Internet shopping using the smartphone 1.

The server for pushing and distribution 3 is a server device which is able to send information to or receive information from the television apparatus 2 via the Internet, and may be via a Cloud Server. The server for pushing and distribution 3 may also be, for example, a server device operated by the manufacturer of the television apparatus 2. The server for pushing and distribution 3 provides the recommendation information about viewing programs and scheduled programs, the item recommendation information based on the content of the viewed program and other services to the television apparatus 2 via the Internet, according to the result of the viewing-related information (viewing history) collected from the television apparatus 2.

The EC website server 4 is a computer device for operating an EC website on the Internet (online shopping). The EC website server 4 is, for example, a server device of the EC platform. The EC server 4 is a platform for purchasing goods and services through the Internet in response to an operation of a user (consumer) on a terminal device (smartphone 1). The EC website server 4 sends an image of an item to the smartphone 1, for example, in response to an operation on the smartphone 1. The EC website server 4 pre-registers redirect_uri in the server for pushing and distribution 3.

Figure 2:
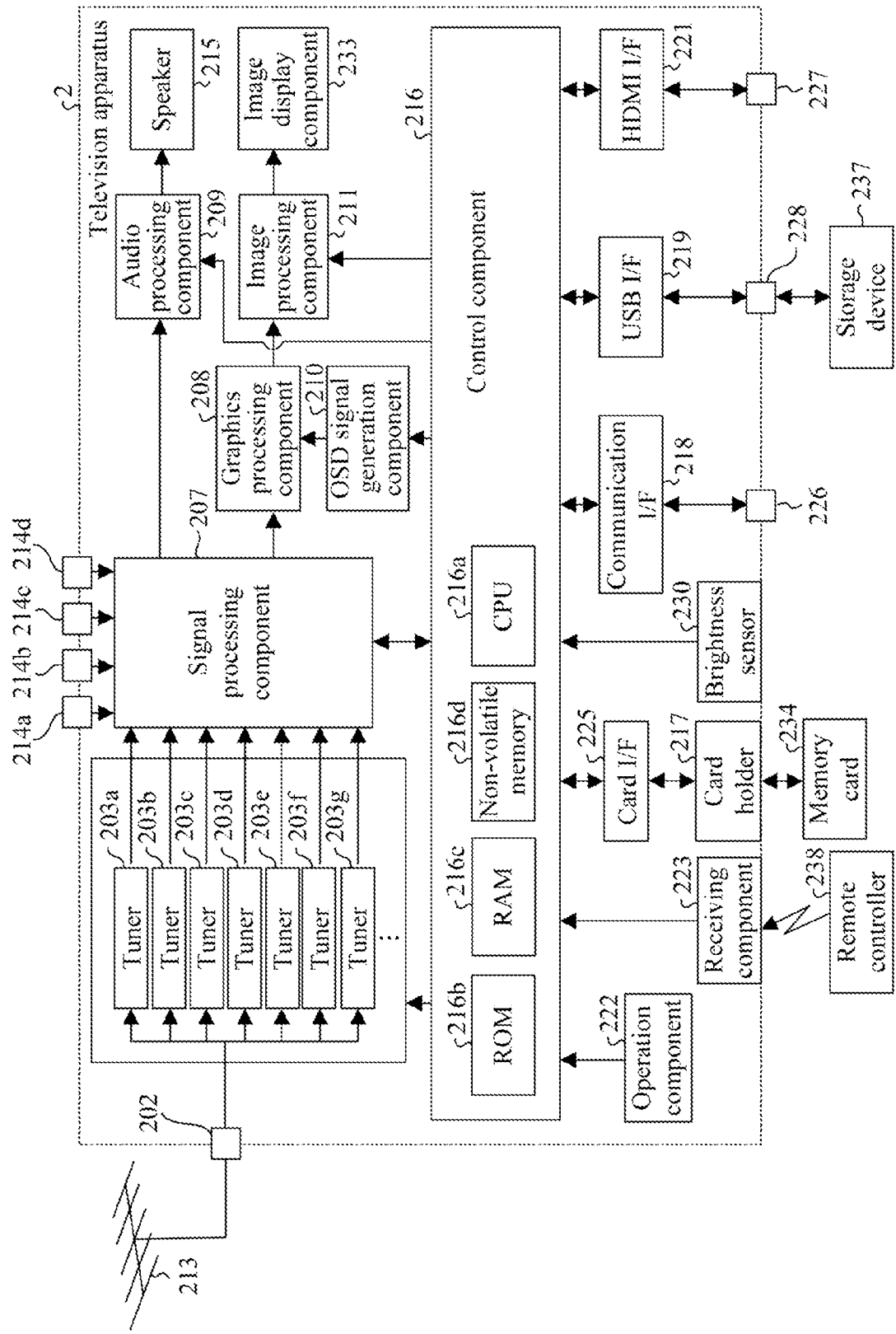
FIG. 2 shows a block diagram of an example of the overall structure of a television apparatus in the first embodiment.

Next, the details of structures in the system S will be described with reference to FIG. 2 and subsequent drawings. FIG. 2 shows a block diagram of an example of the overall structure of the television apparatus 2 in the first embodiment. The television apparatus 2 performs display control on an image display component 233 that is larger than a display component in the smartphone 1 (details will be described later).

As shown in FIG. 2, the television apparatus 2 has an input interface 202, modems 203a-203g, a signal processing component 207, a graphics processing component 208, an audio processing component 209, an OSD (On Screen Display) signal generation component 210 and an image processing component 211.

The terrestrial digital broadcast signal received by a terrestrial broadcast receiving antenna 213 is input to the input interface 202, via which the terrestrial digital broadcast signal is provided to the modems 203a-203g.

The modems 203a-203g are modems for terrestrial digital broadcast signals, and select a broadcast signal of a channel indicated by a control component 216 described later from the terrestrial digital broadcast signals obtained via from the input interface 202.

Furthermore, the television apparatus 2 may also have an input interface that receives a satellite digital broadcast signal received via a BS/CS digital broadcast receiving antenna. The satellite digital broadcasting signal is provided to the modem for satellite digital broadcast through the input interface.

The signal processing component 207 demodulates the broadcast signal including a digital image signal and an audio signal from the broadcast signals from the modems 203a-203g. In addition, the signal processing component 207 performs specific digital signal processing on the image signal included in a digital broadcast signal selectively and outputs it to the graphics processing component 208. In addition, the signal processing component 207 performs specific digital signal processing on the audio signal included in a digital broadcast signal selectively and outputs it to the audio processing component 209.

The signal processing component 207 is connected with a plurality of external input terminals 214a-214d. These external input terminals 214a-214d can input analog image signals and audio signals from a DVD (Digital Versatile Disk) recorder as an example of the external device. The signal processing component 207 digitizes the analog image signals and audio signals input from the external input terminals 214a-214d. Furthermore, the signal processing component 207 performs specific signal processing on the digital image signals and outputs them to the graphics processing component 208. Furthermore, the signal processing component 207 performs specific digital signal processing on the digital audio signals and outputs them to the audio processing component 209.

The graphics processing component 208 superimposes a digital image signal from the signal processing component 207 and an OSD signal generated by the OSD signal generation component 210 and outputs it to the image processing component 211. The graphics processing component 208 can also output either the digital image signal from the signal processing component 207 or the OSD signal generated by the OSD signal generation component 210 to the image processing component 211.

The image processing component 211 converts the digital image signal or OSD signal from the graphics processing component 208 into an analog image signal or OSD signal in a format that can be displayed on the display screen of the image display component 233, and outputs it to the image display component 233. The image display component 233 is, for example, an LCD, an OLED, or the like.

The audio processing component 209 converts the digital audio signal from the signal processing component 207 into an analog audio signal in a format that can be played by the speaker 215, and outputs it to the speaker 215.

The television apparatus 2 further has the control component 216, a card holder 217, various interfaces 218-221, and a brightness sensor 230. The control component 216 includes a CPU 216a, a ROM 216b, a RAM 216c, and a non-volatile memory 216d.

The control component 216 generally controls various operations of the television apparatus 2, for example, operations to receive broadcast signals such as terrestrial digital broadcast signals and satellite digital broadcast signals. Furthermore, the control component 216 controls each component of the television apparatus 2 according to the operation information from the operation component 222 or the operation information input from the remote controller 238 and received by the receiving component 223.

The CPU 216a controls the overall operation of the television apparatus 2 by executing programs stored in the ROM 216b. The ROM 216b mainly stores programs executed by the CPU 216a. The RAM 216c provides a work space when the CPU 216a executes programs. The non-volatile memory 216d stores various setting information and control information of the television apparatus 2.

The control component 216 is connected, via the card I/F 225, with the card holder 217 in which the memory card 234 is removably loaded. Accordingly, the control component 216 can transmit various information to and receive various information from the memory card 234 mounted in the card holder 217 through the card I/F 225.

The control component 216 is connected with the LAN terminal 226 via the communication I/F 218. Accordingly, the control component 216 can transmit various information to and receive various information from external devices such as a relay device 400 connected with the LAN terminal 226 and a LAN-compatible HDD (Hard Disk Drive) through the communication I/F 218. In addition, the communication I/F 218 may be configured to be wirelessly connectable to external devices such as the relay device 400.

The control component 216 is connected with the HDMI interface 227 via the High-Definition Multimedia Interface (HDMI) I/F 221. Accordingly, the control component 216 can transmit various information to and receive various information from the external device connected with the HDMI terminal 227 through the HDMI I/F 221.

The control component 216 is connected with the USB interface 228 via the USB (Universal Serial Bus) I/F 219. Accordingly, the control component 216 can transmit various information to and receive various information from the storage device 237 having the USB HDD or the like connected with the USB interface 228 through the USB I/F 219.

The storage device 237 is configured to have, for example, an HDD, an SSD (Solid State Drive), etc., and stores digital signals received by the television apparatus 2 as recording data. In addition, the storage device 237 may also be built in the television apparatus 2.

Figure 3:
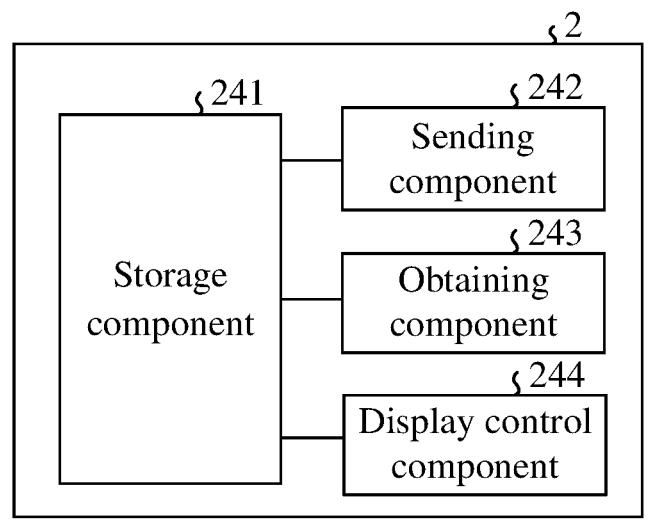
FIG. 3 shows a block diagram of an example of the partial structure of the television apparatus in the first embodiment.

FIG. 3 shows a block diagram of an example of the partial structure of the television apparatus 2 in the first embodiment. The television apparatus 2 includes: a storage component 241 (ROM 216b, RAM 216c, non-volatile memory 216d and storage device 237 in FIG. 2), a sending component 242, an obtaining component 243 and a display control component 244, wherein the sending component 242, obtaining component 243 and display control component 244 are functional modules distinguished when the CPU 216a executes different programs stored in the storage component 241.

The sending component 242 sends various information to external devices. The obtaining component 243 obtains various information from external devices, or reads various information stored in the storage component 241.

The display control component 244 executes display processing for displaying various information on the image display component 233. The display control component 244 displays an image on the image display component 233, for example, in response to an image display request from the smartphone 1 (the details will be described later).

Figure 4:
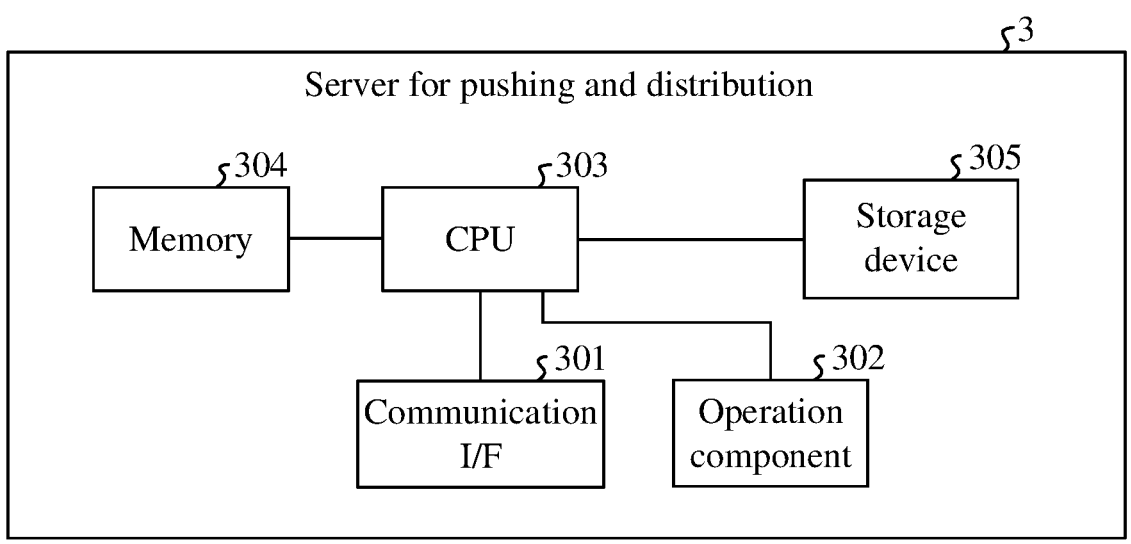
FIG. 4 shows a block diagram of an example of the overall structure of a server for pushing and distribution in the first embodiment.

FIG. 4 shows a block diagram of an example of the overall structure of the server for pushing and distribution 3 in the first embodiment. As shown in FIG. 4, the server for pushing and distribution 3 has a communication I/F 301, an operation component 302, a CPU 303, a memory 304, and a storage device 305.

The communication I/F 301 is an interface for communicating with external devices. The operation component 302 has an input device such as a keyboard and a mouse, and a display device such as a display screen.

The storage device 305 has, for example, an HDD, an SSD, etc., and stores various information. The CPU 303 controls the components of the server for pushing and distribution 3 by executing various programs. The memory 304 has a ROM, a RAM, etc., and stores various programs and various data used by the CPU 303 to perform various arithmetic processing.

Figures 5, 6:
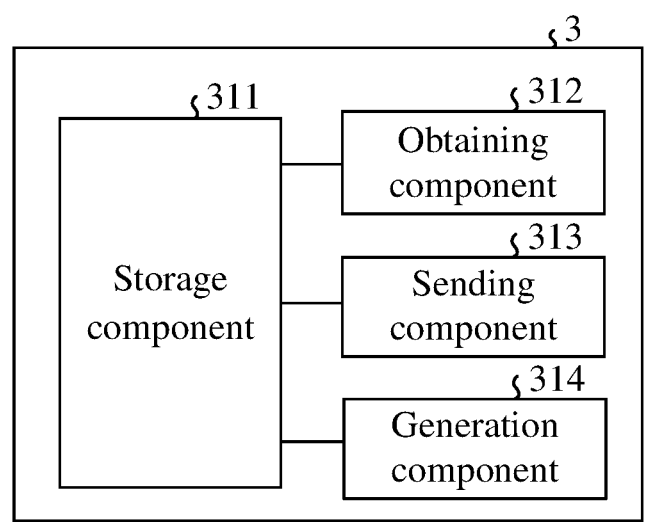
FIG. 5 shows a block diagram of an example of the partial structure of the server for pushing and distribution in the first embodiment.
FIG. 6 shows a diagram of a data structure of data on the server in the first embodiment.

FIG. 5 shows a block diagram of an example of the partial structure of the server for pushing and distribution 3 in the first embodiment. The server for pushing and distribution 3 has a storage component 311 (memory 304, storage device 305), an obtaining component 312, a sending component 313 and a generation component 314, wherein the obtaining component 312, the sending component 313 and the generation component 314 are functional modules distinguished when the CPU 303 executes specific programs stored in the storage component 311.

The storage component 311 stores programs and a DB (Data Base) executed by the CPU 303. Here, an example of the data structure of the DB will be described combining with FIG. 6. As shown in FIG. 6, the information including a TVID (Television ID), an authentication code, an EC website ID, and a token is stored in the DB. In addition, the DB may also contain a TVID and the attribute information (television model, etc.) of the television apparatus 2 corresponding to the TVID.

The TVID is information for identifying the television apparatus 2. The authentication code is a code required to obtain a token described later. The EC website ID is information for identifying the EC website server 4. The token is information for authentication. Referring to FIG. 5, the obtaining component 312 obtains various information from external devices. The sending component 313 sends various information to external devices. The generation component 314 performs an information generation operation on the DB.

Figure 7:
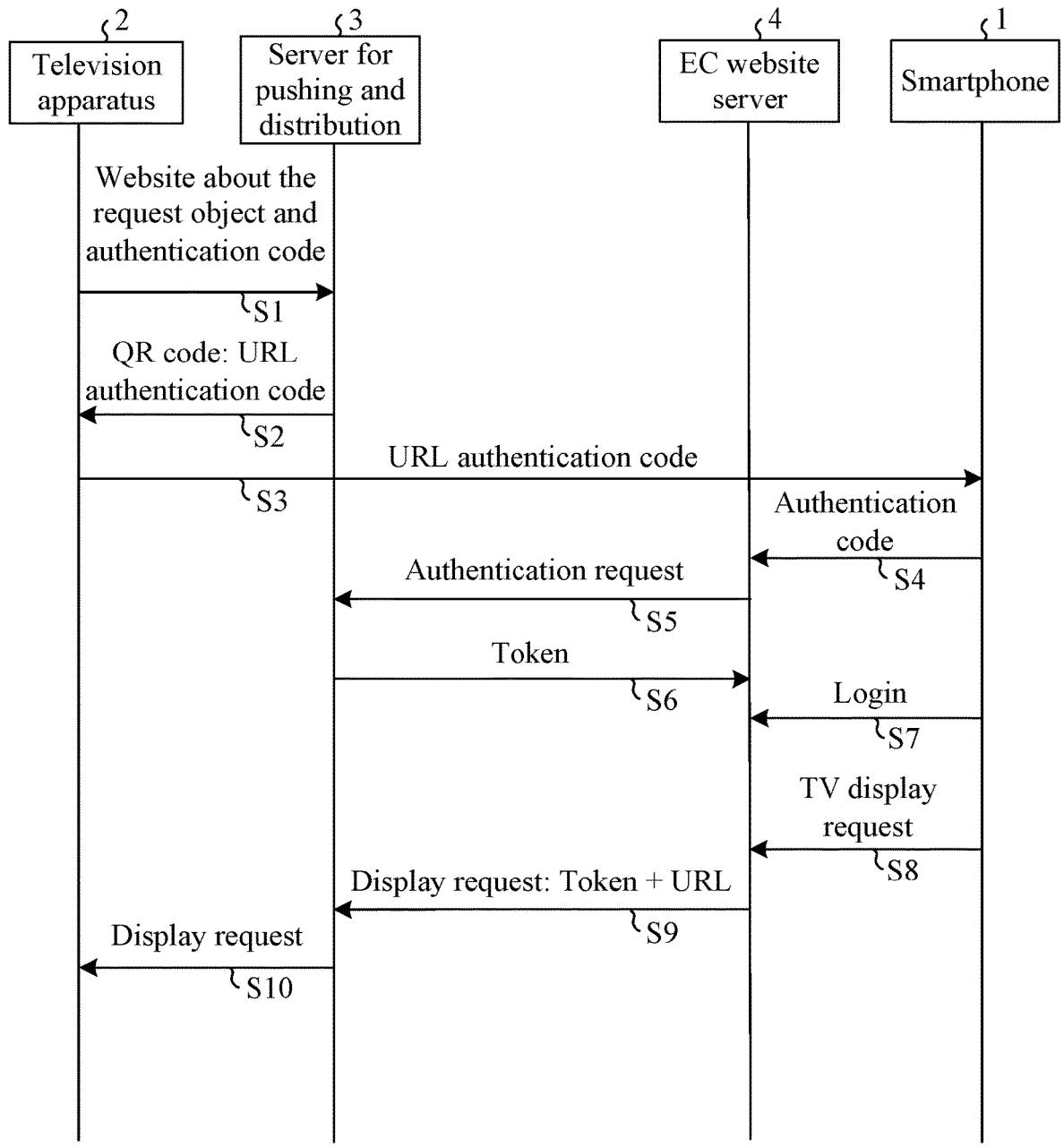
FIG. 7 shows a flowchart illustrating the overall processing in the system in the first embodiment.

Next, the processing flow of structures in the system S will be described. FIG. 7 shows a flowchart illustrating the overall processing in the system S in the first embodiment. Here, starting with a scenario where a user operates the remote control of the television apparatus 2, the user determines, on an initial menu interface (an interface for linking with the EC website or the like), the scenario of the EC website to be linked with the smartphone 1. In addition, the processing of the smartphone 1 shown in FIG. 7 can also be performed by an application installed on the smartphone 1.

As described above, in the television apparatus 2, when the EC website is designated by the user, the sending component 242 of the television apparatus 2 sends the information of the EC website (for example, the ID of the EC website, the URL of the EC website, etc.) and the identifier of the television apparatus 2 (i.e., TVID) to the server 3 in S1. In this way, the sending component 242 sends the information about the image providing apparatus (i.e., the EC website server 4) that provides images to the EC website to the server 3.

The obtaining component 312 of the server 3 obtains the information of the EC website and the TVID from the television apparatus 2. The generation component 314 of the server 3 generates an authentication code, and stores the information including the TVID, the EC server ID as information for identifying the EC website server 4 of the EC website, and the authentication code in the DB of the storage component 311. In addition, the generation component 314 generates a two-dimensional code, i.e., a QR code (registered trademark), based on the authentication code and the URL as the access destination of the EC website. Here, the QR code is illustrated as an example, and other display information is also possible. That is, the display information in other format that can indicate the access destination information of the EC website is also possible. The above-mentioned authentication code may also include a portion for identifying the manufacturer and a portion for identifying the television apparatus 2.

In S2, the sending component 313 of the server 3 sends the above-mentioned QR code to the requester television apparatus 2. In response to a request from the television apparatus 2, the QR code including a URL corresponding to the access destination of the EC website and an authentication code is sent.

The obtaining component 243 of the television apparatus 2 obtains the QR code from the server 3. In this way, the obtaining component 243 of the television apparatus 2 obtains the QR code as the access information based on the authentication code and the URL of the access destination of the EC website. The display control component 244 of the television apparatus 2 displays the QR code on the image display component 233. In this way, the display control component 244 displays and outputs the QR code.

In S3, the QR code displayed on the image display component 233 is read via the QR code reading function via camera scanning or the like. Accordingly, the smartphone 1 obtains the URL of the EC website and the authentication code. In S4, after obtaining the URL of the EC website and the authentication code, the smartphone 1 accesses the EC website server 4 based on the URL, and sends the authentication code at the same time.

After the EC website server 4 obtains the authentication code from the smartphone 1, in S5, the EC website server 4 is identified and the authentication code is simultaneously sent to the server 3 for requesting authentication. In addition, the obtaining component 312 of the server 3 obtains the information for identifying the EC website server 4 and the authentication code. In this way, the obtaining component 312 of the server 3 obtains the authentication code sent from the EC website server 4.

The generation component 314 of the server 3 performs authentication by determining whether there is information associated with information for identifying the EC website server 4 obtained by the obtaining component 312 and the authentication code according to the DB of the storage component 311. The generation component 314 generates a token according to a known technique when there is information associated with information for identifying the EC website server 4 obtained by the obtaining component 312 and the authentication code according to the DB of the storage component 311. In addition, the generation component 314 further associates the token with the following information: the information for identifying the EC website server 4 obtained by the obtaining component 312 and the authentication code in the above-mentioned DB. Among the information including the information for identifying the EC website server 4 obtained by the obtaining component 312 and the authentication code which establishes association with the token, the information associated with the token also includes the TVID of the television apparatus 2 as the requester.

Therefore, the generation component 314 generates association information for associating the television apparatus 2 associated with the authentication code with the token based on the authentication code.

In S6, the sending component 313 of the server 3 sends the token generated by the generation component 314 to the EC website server 4. In this way, the sending component 313 sends the token based on the authentication code to the EC website server 4. The EC website server 4 stores the information that associates the token with the user ID of the smartphone 1 that is the sender of the authentication code.

In S7, the smartphone 1 logs in the EC website server 4 and accesses the EC website. Accordingly, the smartphone 1 displays the EC website interface. Here, the user of the smartphone 1 selects a control for indicating a television display request for a specified link destination on the EC website interface. In S8, in response to the selection, the smartphone 1 sends the URL of the link destination to the EC website server 4, thereby initiating the television display request (TV display request). The EC website server 4 obtains the television display request and the URL of the image display object from the smartphone 1.

In S9, the EC website server 4 sends the token associated with the requester's smartphone 1 and the URL of the image display object to the server 3, and requests display. The obtaining component 312 of the server 3 obtains the token and the URL sent from the EC website server 4. In this way, the obtaining component 312 obtains the token sent from the EC website server 4 and the URL of the access destination of the image as the display object based on the request from the smartphone 1.

In S10, the server 3 determines the TVID associated with the token obtained by the obtaining component 312 according to the DB of the storage component 311. Also, the sending component 313 of the server 3 sends the URL of the access destination of the image as the display object to the television apparatus 2 associated with the TVID.

The obtaining component 243 of the television apparatus 2 obtains the URL of the access destination of the image as the display object. Further, when the sending component 242 of the television apparatus 2 accesses the EC website server 4 based on the URL, the obtaining component 243 obtains the image from the EC website server 4 based on the access destination of the image as the display object. Also, the display control component 244 of the television apparatus 2 causes the image obtained by the obtaining component 243 to be displayed on the image display component 233.

After generating the association information that associates the television apparatus 2 associated with the authentication code with the token based on the authentication code and obtaining the token from the EC website server 4 and the access destination of the image as the display object based on the request from the smartphone 1, the server 3 involved in the first embodiment can cause the television apparatus 2 to display the image corresponding to the request from the smartphone 1 by notifying the television apparatus 2 of the access destination of the image. Accordingly, the server 3 can cause the image requested by the smartphone 1 to be displayed on the television apparatus 2, and the television apparatus 2 can display a picture larger than a picture shown on the smartphone 1.

In addition, the television apparatus 2 outputs the access information including the access destination of the EC website server 4 and the authentication code, obtains the access destination of the image as the display object based on the request from the smartphone 1 from the server 3, and displays the image on the image display component 233. Thereby, the television apparatus 2 can cause the image based on the request of the smartphone 1 to be displayed on the image display component 233, and the image display component 233 can display a picture larger than a picture shown on the smartphone 1.

Second Embodiment

The system S in the second embodiment differs from that in the first embodiment. The server 3 is different for each manufacturer of the television apparatus 2. That is, the system S in the second embodiment includes a plurality of servers 3.

Figure 8:
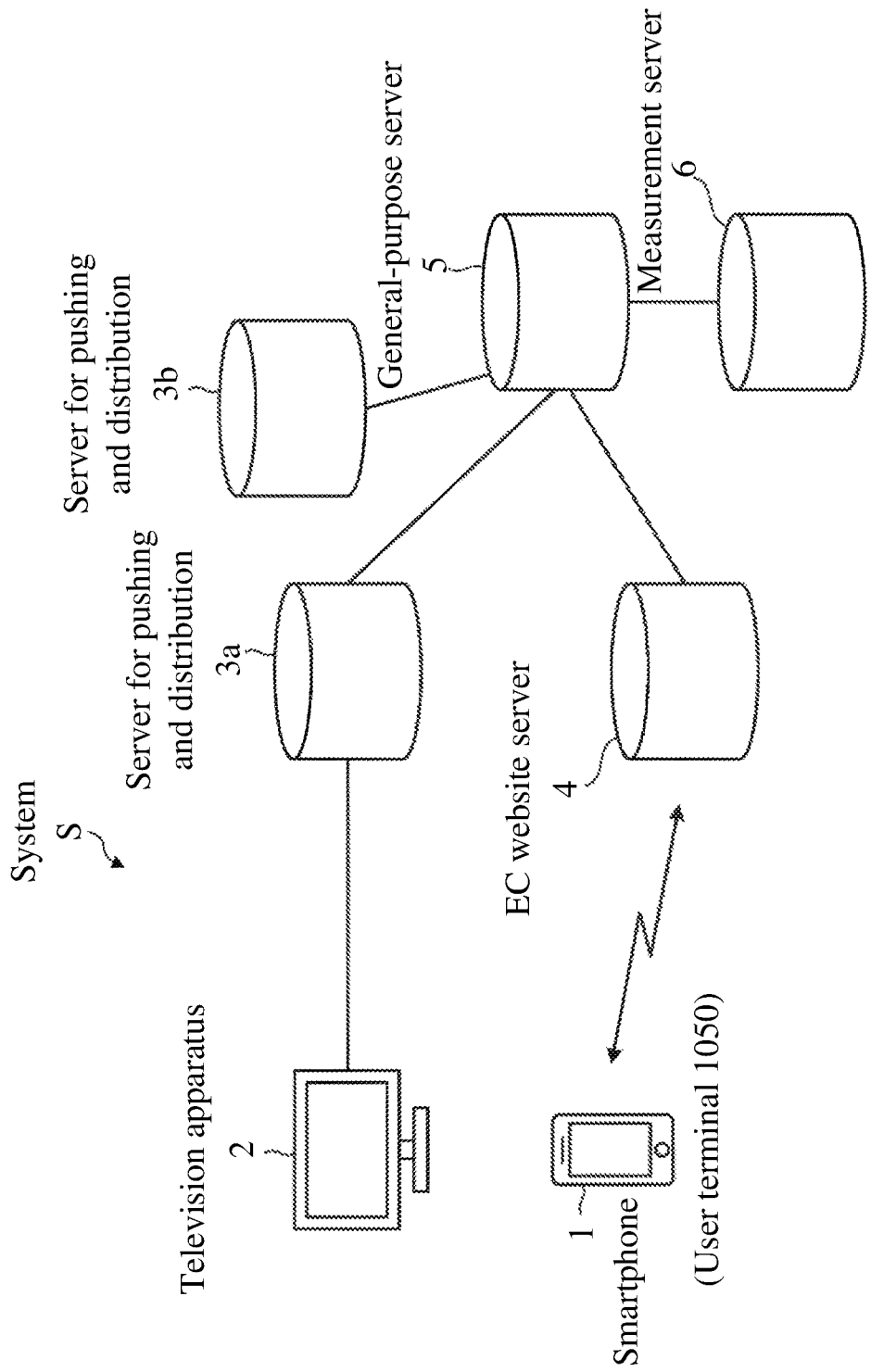
FIG. 8 shows a schematic diagram of an example of the overall structure of a system in a second embodiment.

Here, an example of the overall structure of the system S in the second embodiment will be described. FIG. 8 shows a schematic diagram of an example of the overall structure of the system S in the second embodiment. In addition, the same numerals are used for similar structures as those in the first embodiment, and the description thereof is omitted. As shown in FIG. 8, the system S includes a plurality of servers 3 (a first server 3a and a second server 3b). The second server 3b can be connected with a television apparatus 2 whose manufacturer is associated with the second server 3b, which is a not shown in the figure.

Numeral 2 refers to the television. Numeral 3 refers to the server for pushing and distribution. The server for pushing and distribution 3 is a server of a television manufacturer that manufactures the television apparatus 2, collects the viewing information from the television apparatus 2 via the Internet, and provides recommendations for viewing programs and scheduled programs, the item recommendation based on the viewed program content and other services to the television apparatus 2 according to the collected viewing information.

In addition, numeral 5 refers to a general-purpose server. The general-purpose server 5 is a server of a universal website for television apparatus manufacturer, and connects servers 3 of multiple television manufacturers with an Electronic Commerce (EC) website. The system S has the general-purpose server 5 (server management device) that can send information to or receive information from multiple servers 3 through network. In addition, the general-purpose server 5 can also send information to or receive information from the measurement server 6 through the network, and the measurement server 6 is used for measurement processing of statistics on the results of advertisement display. The general-purpose server 5 is a cloud server that integrates various manufacturers. That is, the general-purpose server 5 is a server for connecting all servers 3 of multiple television manufacturers with the EC website server 4. The general-purpose server 5 issues client credentials (client_id, client_secret) to the EC website server 4.

In addition, a random password set in x-api-key is preset between the server 3 and the general-purpose server 5. The x-api-key transferred between the general-purpose server 5 and the EC website server 4 becomes pass-key.

Numeral 4 refers to the EC website server. The EC website server 4 is a server of the EC platform. For a user, i.e., a consumer, a server of a platform for purchasing goods and services is the EC website server 4. In addition, the EC website server 4 pre-registers the redirect_uri in the general-purpose server 5.

Numeral 1050 refers to a user terminal. The user terminal 1050 is a terminal having an application and an optical reading device such as a camera, where the application is used for connecting the television apparatus 2 with the user terminal 1050. The smartphone 1 is an example of the user terminal 1050. In the first embodiment, the smartphone 1 has been illustrated as the user terminal 1050, but the user terminal 1050 is not limited to the smartphone. The user terminal 1050 may be a PC, a tablet terminal, or the like. In addition, these terminals can replace the smartphone shown in the first embodiment.

Figure 9:
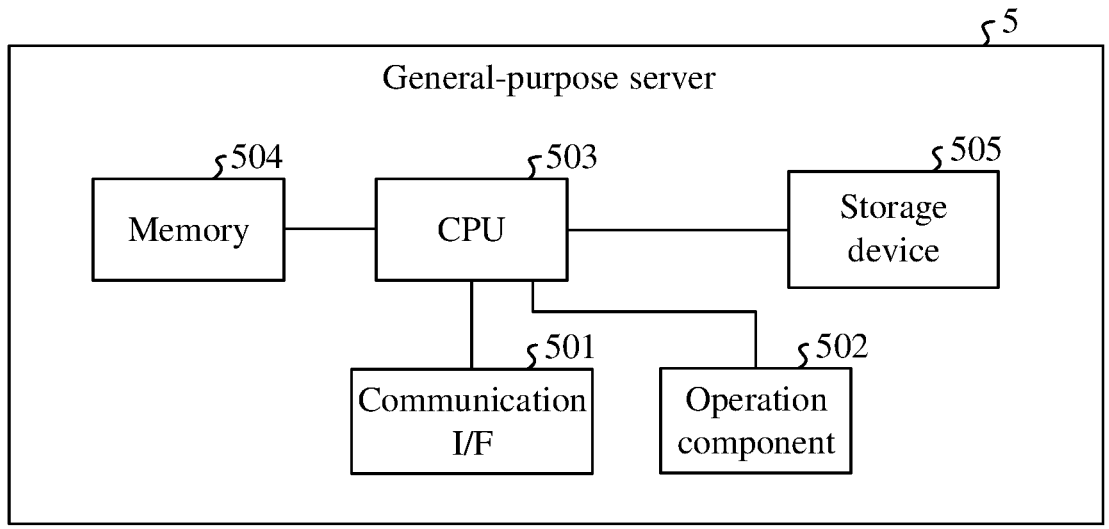
FIG. 9 shows a block diagram of an example of the overall structure of a general-purpose receiving server in the second embodiment.

FIG. 9 shows a block diagram of an example of the overall structure of the general-purpose server 5 in the second embodiment. As shown in FIG. 9, the general-purpose server 5 includes a communication I/F 501, an operation component 502, a CPU 503, a memory 504, and a storage device 505.

The communication I/F 501 is an interface for communicating with external devices. The operation component 502 has an input device such as a keyboard and a mouse, and a display device such as a display screen.

The storage device 505 has, for example, an HDD, an SSD, etc., and stores various information. The CPU 503 controls the components of the general-purpose server 5 by executing various programs. The memory 504 has a ROM, a RAM, etc., and stores various programs and various data used by the CPU 503 to perform various arithmetic processing.

Figure 10:
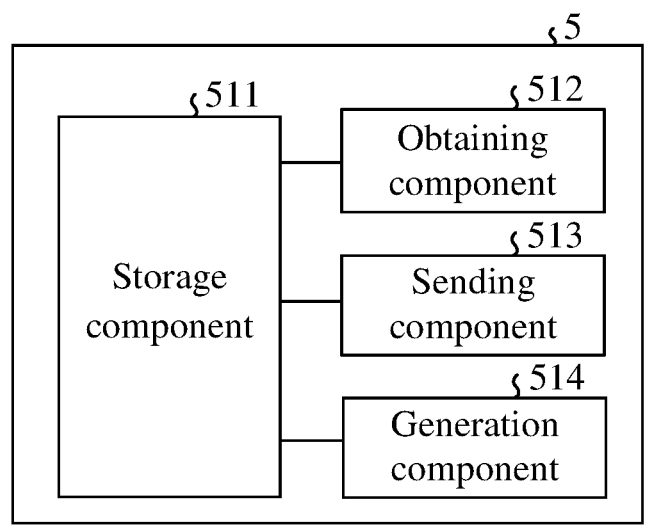
FIG. 10 shows a block diagram of an example of the partial structure of the general-purpose server in the second embodiment.

FIG. 10 shows a block diagram of an example of the partial structure of the general-purpose server 5 in the second embodiment. The general-purpose server 5 has a storage component 511 (memory 504, storage device 505), an obtaining component 512, a sending component 513 and a generation component 514, wherein the obtaining component 512, the sending component 513 and the generation component 514 are functional modules distinguished when the CPU 503 executes specific programs stored in the storage component 511.

The storage component 511 stores programs and a DB (Data Base) executed by the CPU 503.

The obtaining component 512 obtains various information from external devices. The sending component 513 sends various information to external devices. The generation component 514 performs an information generation operation on the DB.

Figure 11:
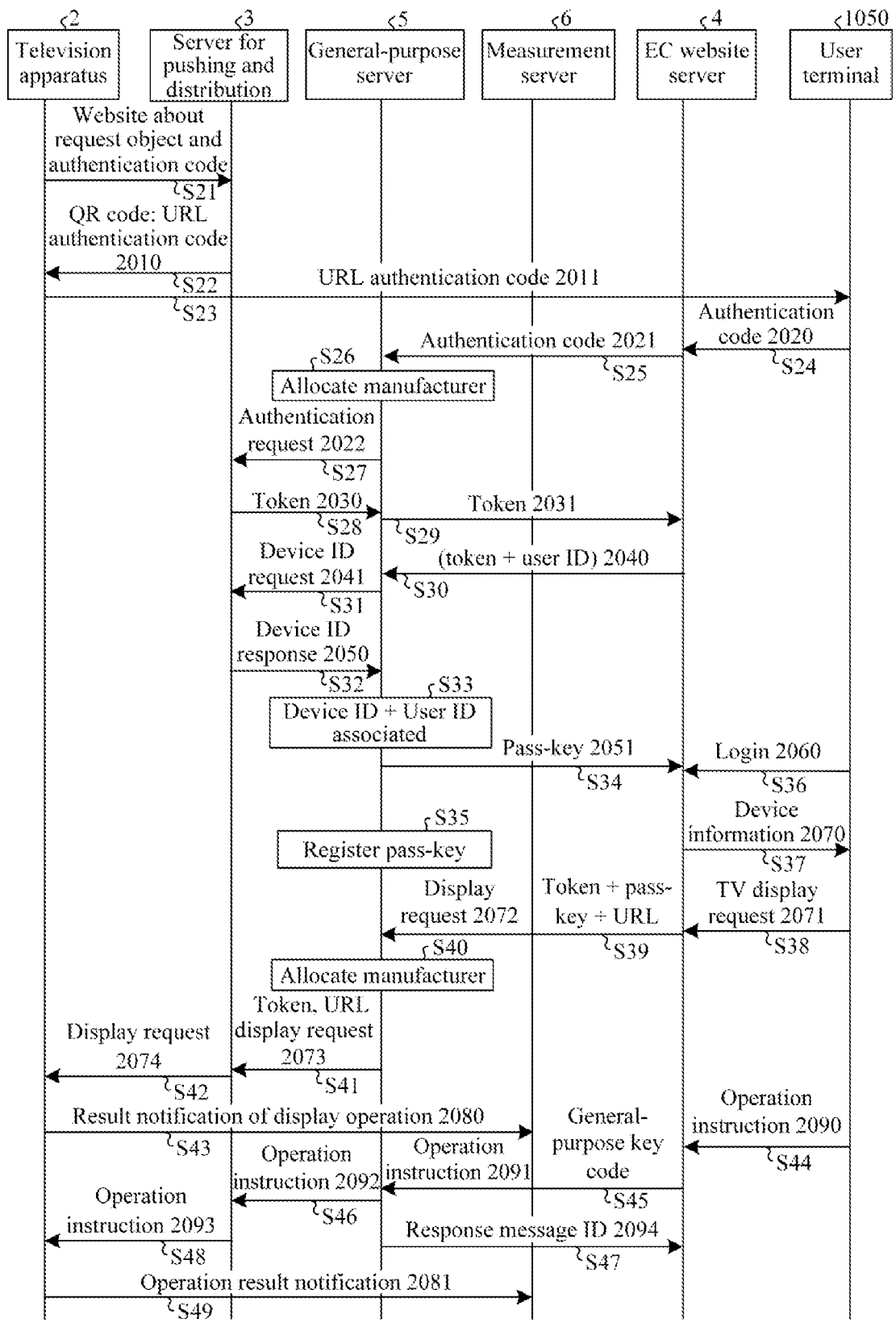
FIG. 11 shows a flowchart illustrating the overall processing in the system in the second embodiment.

Next, the processing flow of parts in the system S of the second embodiment will be described. FIG. 11 shows a flowchart illustrating the overall processing in the system S in the second embodiment. The flowchart shown in FIG. 11 also begins with a scenario in which a user operates the remote control of the television apparatus 2, specifies the EC website to be linked with the smartphone 1 on the initial menu interface. Furthermore, the authentication code and token generated by the server 3 include information for identifying the manufacturer. That is, the server for pushing and distribution 3 includes the information for identifying itself in the authentication code and token.

In addition, since S21 of FIG. 11 is similar to S1 of FIG. 7, the description thereof is omitted. In S22, the URL authentication code is sent from the server 3 to the television apparatus 2. The URL authentication code 2010 is information including the URL information for determining the EC website server 4 and an authentication code, where the authentication code is used for authentication between the EC website server 4 and the server for pushing and distribution 3. The authentication code may also include a portion for identifying the manufacturer of the television apparatus 2 and a portion for identifying the television apparatus 2. In addition, the portion for identifying the television apparatus 2 included in the authentication code is a random value. In addition, the server for pushing and distribution 3 may associate the time when the random value is sent to the television apparatus 2 with the information of the DB of the storage component 311.

An example of the information of the URL authentication code 2010 is as follows:

https://XXXXXXX YYYYYYYYY.

The part denoted by X includes the URL of the EC website server 4, and the part denoted by Y includes the authorization code of OAuth2. The part of the authorization code includes the information for identifying the manufacturer and the television. The information for identifying the manufacturer and the television apparatus 2 may be any part of the authorization code. The sending format of the URL authentication code 2010 may be any format as long as the above-mentioned information is included.

After the obtaining component 243 of the television apparatus 2 obtains the URL authentication code 2010 from the server 3, the display control component 244 displays and outputs the content of the URL authentication code 2010 on the image display component 233 as an optical image or video. In addition, the display format of the display control component 244 may be a QR code, barcode, text, or the like, as long as the information contained in the URL authentication code 2010 can be displayed and output as an optical image or video. Furthermore, in the first embodiment, the description was given in the form of QR code, but this embodiment is not limited to the QR code.

Furthermore, as in S3 of FIG. 7, in S23, the user terminal 1050 reads the URL authentication code 2011 displayed on the image display component 233 by reading the URL authentication code from the image information captured by camera scanning. Accordingly, the user terminal 1050 obtains the URL of the EC website and the authentication code. The authentication code part is a time-limited authentication code and includes:

"code": <authorization code>

"state": <string> // random number

In S24, after obtaining the URL of the EC website and the authentication code, the user terminal 1050 accesses the EC website server 4 based on the URL, and sends the authentication code 2020 simultaneously.

The authentication code 2020 is the authentication code part of the URL authentication code 2010 and URL authentication code 2011 (<authorization code>). The authentication code 2021 is as follows:

"code": <authorization code>,

"state": <string> //random number

Moreover, the authentication code 2020 may include the URL information of the EC website server 4 in addition to the above content.

In S25, after receiving the authentication code 2020, the EC website server 4 sends the authentication code 2021 to the general-purpose server 5 for requesting authentication. The EC website server 4 sends an authentication request to, for example, Token Endpoint of OAuth2 of the general-purpose server 5. The information of the authentication code 2021 includes:

Authorization: "Basic"+Base64 (<client_id>)+":"+<client_secret>

Content-type: application/x-www-form-urlencoded grant_type: "authorization_code"

code: <authorization code> (Authentication Code)

redirect_uri: an entry when returning to the EC website of the EC website server 4 is pre-registered on the general-purpose server 5.

client_id: an identifier is assigned per EC website of the EC website server 4. It is pre-registered on the general-purpose server 5.

The client_secret is allocated by the general-purpose server 5 for each website of the EC website server 4 based on client_Id. The website of the general-purpose server 5 checks the manufacturer extension name in the code and performs a redirection (Redirect).

In S26, the sending component 313 of the general-purpose server 5 determine the server 3 of the sender according to the obtained authentication code 2021 and the information for identifying the manufacturer included in the authentication code 2021. Specifically, the sending component 313 of the general-purpose server 5 confirms the authorization code and determines which server 3 it is.

Then, in S27, the sending component 313 of the general-purpose server 5 requests authentication by sending the authentication request 2022 to the server 3, the sender. In this way, the sending component 313 of the general-purpose server 5 sends the authentication request 2022 to the sender server 3 determined based on the authorization code. The information of the authentication request 2022 transmitted from the sending component 313 of the general-purpose server 5 is the same as the information of the authentication code 2021 obtained from the EC website server 4. Another example of information as the authentication request 2022 is as follows:

GET http://each-maketexample.com/common/devices/id
Authorization: "Bearer" +<access_token>

The obtaining component 312 of the server 3 obtains the information for identifying the EC website server 4 and the authentication code recorded in the URL authentication code 2010.

The generation component 314 of the server 3 performs authentication, according to the DB of the storage component 311, by determining whether there are information associated with information for identifying the EC website server 4 obtained by the obtaining component 312 and the authentication code. The generation component 314 generates a token 2030 according to the DB of the storage component 311, when there are information associated with information for identifying the EC website server 4 obtained by the obtaining component 312 and the authentication code. In addition, the generation component 314 associates the token 2030 with information including first information for identifying the EC website server 4 obtained by the obtaining component 312 in the above-mentioned DB and second information of the authentication code.

In S28, the sending component 313 of the server 3 sends the token 2030 generated by the generation component 314 to the general-purpose server 5.

In some embodiments, the sending component 313 of the server 3 sends Token Response of OAuth2 as the token 2030 to the general-purpose server 5. The OAuth2 Access Token Response in this response is as follows:

{"access_token": <access token>,
"token_type": "Bearer",
"expires_in": 3600,
"refresh_token": <refresh token>}

Here, access_token is added when the server 3 accesses the general-purpose server 5; expires_in is the valid period (measure in seconds) of access_token, which is stored in advance together with the time from the time of being received to the time becoming invalid, and before the expire time the access_token is reused. The EC website server 4 stores refresh_token secretly for security consideration, since it is not good to just set refresh_token in the Local Storage. When a manufacturer issues an access_token and a refresh_token, the television manufacturer can be determined by adding an identifier for identifying the television manufacturer at the beginning.

The obtaining component 512 of the general-purpose server 5 obtains the token 2030. Then, in S29, the general-purpose server 5 sends the token 2030 as the token 2031 to the EC website server 4, and the EC website server 4 obtains the token 2031. In addition, the sending component 313 of the server 3 may directly send the token to the EC website server 4.

The EC website server 4 stores a token that associates the token 2031 with the user ID of the user terminal 1050 which is the sender of the authentication code.

Then, in S30, the EC website server 4 responds with the token 2031 and the user ID and sends the (token+user ID) 2040 to the general-purpose server 5. Accordingly, the EC website server 4 can send the user ID of the user of the user terminal 1050 to the general-purpose server 5.

The structure of the token sent from the EC website server 4, the (token+the user ID) 2040, is as follows:

POST https://tv-common.example.com/common/users/id
Authorization: "Basic"+Base64 (<client_id>+":"+<client_secret>)
Content-type: application/x-www-form-urlencoded
{grant_type: "access_token",
access_token: <access token> (issued as access token in S28)
client_id: an identifier assigned per website of the EC website server 4, which is pre-registered on the manufacturer's general-purpose website,
user_id: user ID of the website on EC website server 4,
Preference: <current user attributes (including user's birthday, gender, zip code, purchase history, etc.)>

The obtaining component 512 of the general-purpose server 5 obtains the (token+user ID) 2040 from the EC website server 4. In S31, the sending component 513 of the general-purpose server 5 determines the sender server 3 according to the (token+user ID) 2040, and sends a device ID request 2041 (TVID) to the sender server 3. In addition, the sending component 513 of the general-purpose server 5 may send a token when sending the device ID request 2041.

The device ID request 2041 is used for the general-purpose server 5 to query the device_id (TVID) of the TV from each manufacturer (server 3) through access_token of OAuth2, for example, as follows:

GET https://each-maker.example.com/common/devices/id
Authorization: "Bearer" +<access_token>
x-api-key: <random password formulated by manufacturer's general-purpose website and each manufacturer>
Content-type: application/json
client_id: an identifier assigned per manufacturer's general-purpose website The server 3 obtains the TVID associated with the obtained token according to the DB of the storage component 311. In addition, the server 3 may also obtain the information of the device associated with the obtained TVID (the attribute information of the television apparatus 2 with the TVID). In S32, the sending component 313 of the server 3 sends the information such as the TVID to the general-purpose server 5 as a device ID response 2050. An example of the device ID response 2050 is as follows:

"device_id": <id> (TVID assigned by the server for pushing and distribution 3 to the television apparatus 2)
"model": <model name> (indicating model of television apparatus 2, that is, display image size and pixel information such as 2K, 4K, 8K, etc.)

In S33, the generation component 514 of the general-purpose server 5 registers the binding information associating the obtained TVID (device ID), user ID, and the model information (model) of the television apparatus 2 together in the storage component 511 as the information of the DB.

Furthermore, the generation component 514 of the general-purpose server 5 generates the pass-key 2051. Furthermore, the sending component 513 sends the pass-key to the EC website server 4 in S34. The pass-key includes the following information:

"pass_key": <pass_key> (the pass-key is used as ID in operation instruction 2090 to operation instruction 2093 after S44)

"expires_in": 86400 (with a grace period of about 10 days even if no preference prepared in the first access)

"model": <model name> (the model information in the device ID response, that is, the model of the television apparatus 2, i.e., the display image size and pixel information such as 2K, 4K, 8K, etc.)

Furthermore, the generation component 514 of the general-purpose server 5 stores the generated pass-key in the storage component 511 in S35.

After obtaining the pass-key from the general-purpose server 5, the EC website server 4 stores the information contained in the pass-key. Specifically, the following information is stored for each user of the EC website:

access_token
refresh_token
pass_key
model//linked TV model information

In S36, the user terminal 1050 logs in the service provided by the EC website server 4 for free by starting an application. Accordingly, the smartphone 1 displays the EC website picture. An icon for connecting with the television apparatus 2 is also presented on the EC website picture output by the application. Furthermore, in S37, the EC website server 4 sends the device information 2070 to the user terminal 1050 in response to the login in S36. The device information 2070 here refers to any one, or a combination of two or three of device ID, user ID and model name included in the pass-key 2051.

For a link destination of the EC website picture, the user of the smartphone 1 selects the icon for connecting with the television apparatus 2. In S38, the user terminal 1050 sends a television display request (TV display request 2071) by sending the URL of the link destination to the EC website server 4 in response to the selection.

After receiving the TV display request 2071 from the user terminal 1050, the EC website server 4 sends a display request 2072 including the token, the pass-key and the URL of the link destination to the general-purpose server 5 in S39, thereby enabling the television apparatus 2 to perform the display instruction. The information structure of the display request 2072 is as follows:

POST https://tv-comon.example.com/common/devices/control
Authorization: "Bearer" +<access_token>
x-api-key: <pass_key>
Content-type: application/jison
"command_type": "keycode"
"keycode": "<common key code> " 1
{"command_type": "webview",
"site":"<Websit URL>",
"Template": "full" }

The obtaining component 512 of the general-purpose server 5 receives the information of the display request 2072 including the token, the pass-key, and the URL of the link destination from the EC website server 4. Then, the obtaining component 512 extracts pass_key from the header of x-api-key.

In S40, the obtaining component 512 determines the access destination and the access source according to the pass-key (pass_key) and the information stored in the storage component 511. In S41, the sending component 513 sends the information including the token and the URL to the server 3 based on the result of the determination, and the display request is responded. In this way, the sending component 513 sends the token and the access destination of the image which is the display object to the sender server 3.

In addition, the general-purpose server 5 measures the number of visits for each access source and manufacturer.

The display request 2073 sent from the sending component 513 to the server 3 includes a token, a client ID, a URL, and a message. An example of this information is as follows:

POST https://each-maker.example.com/common/devices/control
Authorization: "Bearer" +<access_token>
x-api-key: <random password formulated by manufacturer's general-purpose website and each manufacturer>
Content-type: application/json
{"comand_type": "keycode",
"keycode": <common key code>,
"client_id": <client_id>,
"messageid:<message ID>}
"command_type": "webview",
"site":<Website URL> (Website URL of television)
"template": "full",
"client_id": <client_id>,
"messageid": <message ID>}

The obtaining component 312 of the server 3 receives the display request 2073 from the general-purpose server 5. The obtaining component extracts access_token from the Authorization header of the display request 2073 and identifies the television apparatus 2. In S42, the sending component 313 of the server 3 outputs a display request 2074 to the television apparatus 2 based on the identification result. In addition, the display request may also be replaced by the manufacturer's own display request instruction. In addition, the server 3 may also count the access of each client_id and sends a display request to the television as needed.

In S43, the television apparatus 2 starts the browser in response to the display request, runs javascript using onLoad, onClick Event, etc., and then displays and outputs the image from the URL destination of the display object. In addition, the television apparatus 2 notifies the measurement server 6 of a result notification 2082 of the display operation for identifying the service provider, the user, the TV manufacturer, and the displayed advertisement. The measurement server 6 counts the results of the advertisement display on a plurality of television apparatuses 2 requested by the server 3. Based on this statistical result, the manufacturer, the general-purpose server 5, or the owner of the measurement server 6 requests the EC website platform that owns the EC website server 4 for advertising promotion fees.

The application on the user terminal 1050 can operate the screen of the television apparatus 2 based on an operation instruction 2090 in S44. In response to an operation from the user terminal 1050, the operation instruction 2090 is sent to the EC website server 4.

In S45, the EC website server 4 sends an operation instruction 2091 including a general-purpose key code to the general-purpose server 5 based on the operation instruction 2090 sent in S44. The general-purpose key code is an instruction configured to be associated with a button on the remote control of the television, including numbers, cross cursor, volume/channel/power, color keys, function keys, media controller, manufacturer-specific instructions. The manufacturer-specific instructions are instructions operated by each manufacturer itself. That is, the manufacturer-specific instructions refer to operation instructions specific to each manufacturer set by the manufacturer. The general-purpose key codes are key codes used to perform common operations among manufacturers, in addition to manufacturer-specific instructions.

Digit number instructions are "11", "12", "0", "1", "2", "3", "4", "5", "6", "7", "8", "9", ".".

The cross cursor instructions are "up", "down", "left", "right", "page up", "page down", "page left", "page right", "enter", "exit", "back".

The volume/channel/power instructions are "power", "power off", "power on", "volume up", "volume down", "channel up", "channel down".

The color keys are "blue", "red", "green", "yellow".

The function key instructions are "electronic program guide", "initial configuration", "select broadcast type", "input select", "display information", "mute", "contents menu", "closed caption".

The media controller instructions are "Play", "stop", "pause", "rewind", "forward", "backward", "skip forward", "skip backward", "record".

After receiving the operation instruction 2091 in S45, the general-purpose server 5 sends an operation instruction 2092 to the server 3 in S46. The operation instruction 2092 is the same instruction as the operation instruction 2091.

In S47, the general-purpose server 5 sends a response message ID 2094 as a response message to the EC website server 4. The message ID includes:

{messageid:<message ID>}

After receiving the operation instruction 2092 from the general-purpose server 5, the server 3 sends an operation instruction 2093 to the television apparatus 2 in S48. The operation instruction 2093 is information similar to or equivalent to the operation instruction 2092, and is an instruction of the manufacturer to perform the display operation of the image on the television apparatus 2. The server 3 replaces the operation instruction 2092 with the operation instruction 2093, which is a key code of each company for performing the operation on the television apparatus 2. In the case when the operation instructions of the television apparatus 2 become more standardized, the operation instruction 2092 may not be converted, and the operation instruction 2093 is used all the time.

The television apparatus 2 operates the image displayed on the image display component 233 of the television apparatus 2 based on the operation instruction 2093. Furthermore, the television apparatus 2 notifies the measurement server 6 of the operation result notification 2081 for identifying the operation instruction in S49.

The flowchart shown in FIG. 11 has explained the process in which a plurality of manufacturers access the EC website server 4 of the platform. However, as the server 3 of the first embodiment, the manufacturers can individually access the EC website server 4. In this case, the actions of the server 3 and the general-purpose server 5 are combined. The information exchange between the server 3 and the general-purpose server 5 is omitted in this case.

The general-purpose server 5 obtains an authentication code from the EC website server 4, sends the authentication code to the sender server 3 determined based on the authentication code, obtains a token and the access destination of an image which is the display object from the EC website server 4, and then sends the token and the access destination of the image which is the display object to the sender server 3. Accordingly, processing can be performed without determining which of the plurality of servers 3 should be sent to from the EC website server 4 side.

In addition, the programs run by devices (user terminal 1050, television apparatus 2, server 3, EC website server 4, general-purpose server 5, measurement server 6) of this embodiment are stored in the computer-readable storage media such as CD (Compact Disc)-ROM (Read Only Memory), Floppy Disk (FD), CD-R (Recordable), DVD (Digital Versatile Disk), as files in an appropriate format or executable format. Furthermore, the programs may be provided or distributed via network such as the Internet.

Third Embodiment

Figure 12:
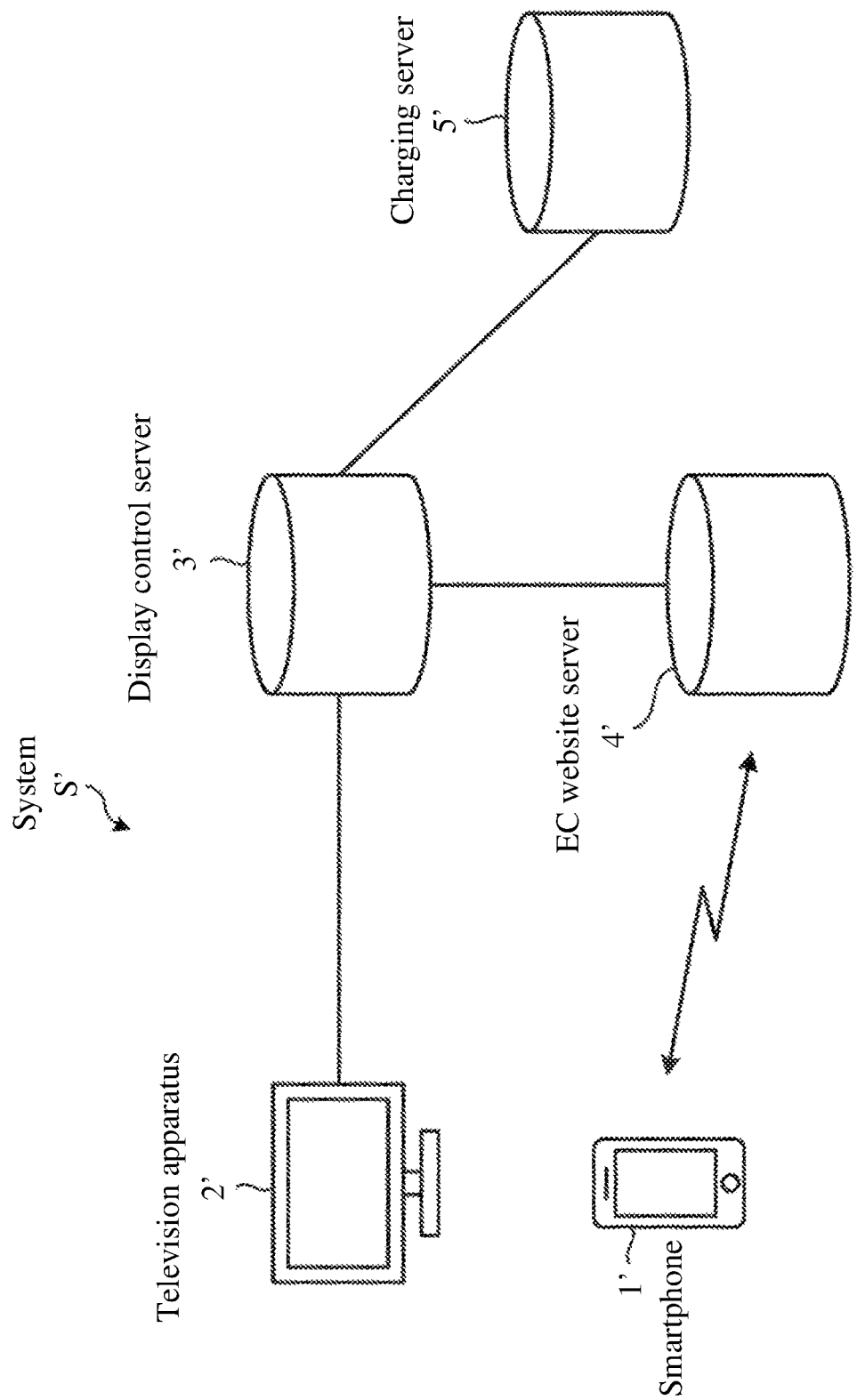
FIG. 12 shows a schematic diagram of an example of the overall structure of a system in a third embodiment.

Firstly, an example of the overall structure of the system S' in the third embodiment will be described with reference to FIG. 12. FIG. 12 shows a schematic diagram of an example of the overall structure of the system S' in the third embodiment. The system S' includes a smartphone 1' (first information processing apparatus), a television apparatus 2' (second information processing apparatus), a display control server 3' (second server device), an EC website server 4' (first server device) and a charging server 5' (charging server device). The display control server 3' can communicate with the television apparatus 2', the EC website server 4' and the charging server 5' through a public communication network such as the Internet. Furthermore, the smartphone 1' can wirelessly communicate with the EC website server 4' and the display control server 3' via a base station.

The smartphone 1' is an example of an information terminal held by the user of the television apparatus 2'. The smartphone 1' includes a communication I/F, an audio input component (microphone), a group of sensors, a display component, a graphics controller, a touch panel controller, a CPU, a memory, a camera, a speaker, etc. In the third embodiment, it is assumed that the user performs Internet shopping using the smartphone 1'.

The overall structure of the television apparatus 2' is similar as that of the television apparatus 2 in the first embodiment, and will not be repeated here. The television apparatus 2' executes display control on the image display component 233 (second display component) larger than the first display component in the smartphone 1' (the details will be described later). Hereinafter, the details of the structures in the system S' will be described with reference to FIG. 13 and subsequent figures.

Figure 13:
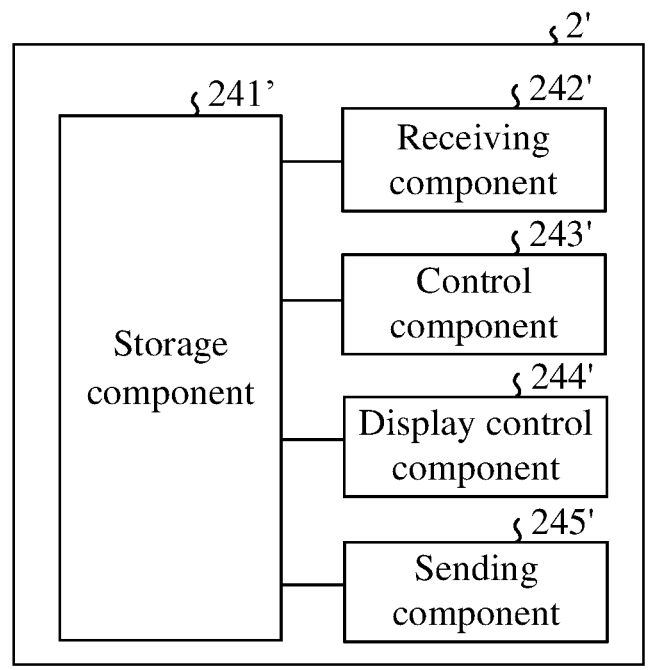
FIG. 13 shows a block diagram of an example of the partial structure of a television apparatus in the third embodiment.

FIG. 13 shows a block diagram of an example of the partial structure of the television apparatus 2' in the third embodiment. The television apparatus 2' includes a storage component 241 (ROM 216b, RAM 216c, non-volatile memory 216d, and storage device 237 in FIG. 2), and furthermore, includes a receiving component 242', a control component 243', a display control component 244' and a sending component 245', as functional modules distinguished when the CPU 216a executes specific programs stored in the storage component 241'.

The receiving component 242' receives various information from external devices. The control component 243' performs various arithmetic processing, stores various information in the storage component 241', or reads out various information stored in the storage component 241'.

The display control component 244' executes display processing for displaying various information on the image display component 233 (second display component). The display control component 244' displays an image of an item in actual physical size on the image display component 233, for example, in response to obtaining a request signal to display the item in actual physical size from the display control server 3' (the details will be described later). The sending component 245' sends various information to external devices.

Figure 14:
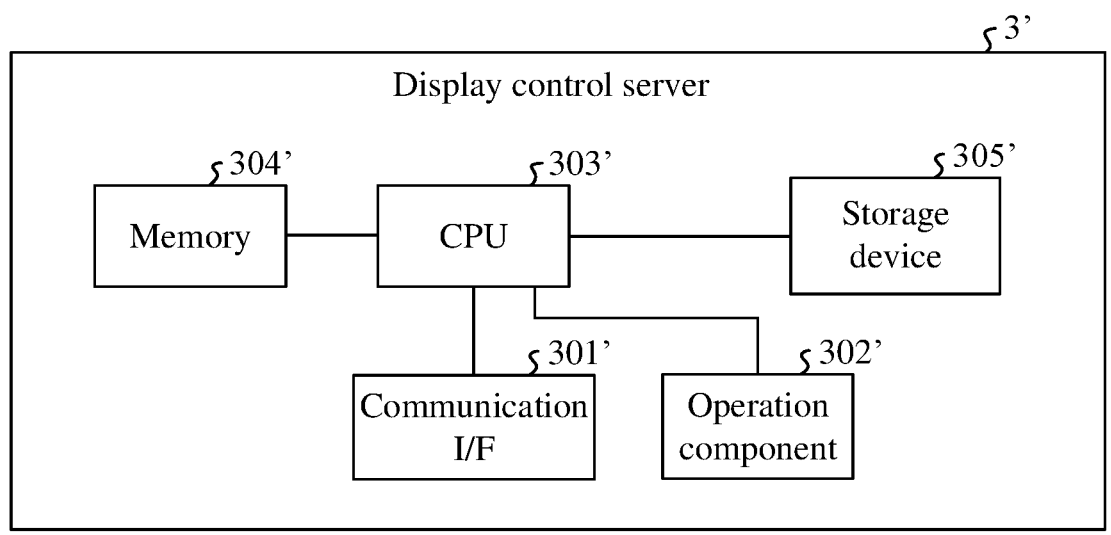
FIG. 14 shows a block diagram of an example of the overall structure of a display control server in the third embodiment.

FIG. 14 shows a block diagram of an example of the overall structure of the display control server 3' in the third embodiment. As shown in FIG. 14, the display control server 3' includes a communication I/F 301', an operation component 302', a CPU 303', a memory 304', and a storage device 305'.

The communication I/F 301' is an interface used for communication with an external device. The operation component 302' has an input device such as a keyboard and a mouse, and a display device such as a display.

The storage device 305' has, for example, an HDD, an SSD, etc., and stores various information. The CPU 303' controls the components of the display control server 3' by running various programs. The memory 304' has a ROM, a RAM, etc., and stores various programs and various data used in various arithmetic processing performed by the CPU 303'.

Figure 15:
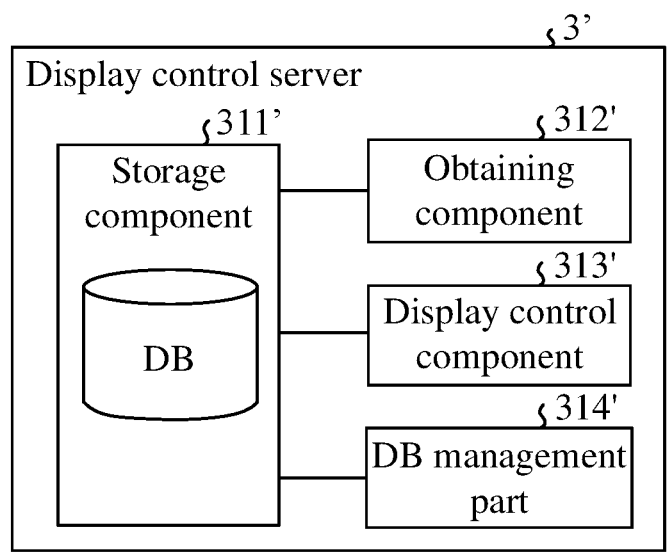
FIG. 15 shows a block diagram of an example of the partial structure of the display control server in the third embodiment.

FIG. 15 shows a block diagram of an example of the partial structure of the display control server 3' in the third embodiment. The display control server 3' includes a storage component 311' (a memory 304' and a storage device 305'), and furthermore, includes an obtaining component 312', a display control component 313' and a DB management part 314', as functional modules distinguished when the CPU 303' runs programs stored in the storage component 311'.

The storage component 311' stores programs and a DB (Data Base) to be run by the CPU 303'. The DB stores, for example, the correspondence information that establishes a correspondence among at least the identification information of the smartphone 1', the identification information of the television apparatus 2', and the information on the screen size and resolution of the image display component 233 of the television apparatus 2'. The obtaining component 312' obtains various information from external devices.

The display control component 313', for example, in response to obtaining a first request signal for displaying the image of the item in a size as an actual physical size of the item from the smartphone 1', sends a second request signal for displaying an image of the item in actual physical size to the television apparatus 2' based on the correspondence information that establishes a correspondence among the identification information of the smartphone 1', the identification information of the television apparatus 2', and the information on the screen size and resolution of the image display component 233 of the television apparatus 2'. The display control component 313' causes an image signal which has been processed for displaying the item in actual physical size on the image display component 233 of the television apparatus 2', to be contained in the second request signal, for example, based on an object (e.g., a credit card) in a specified international standard size presented on the image.

The DB management part 314' executes information read and write operations on the DB.

Figure 16:
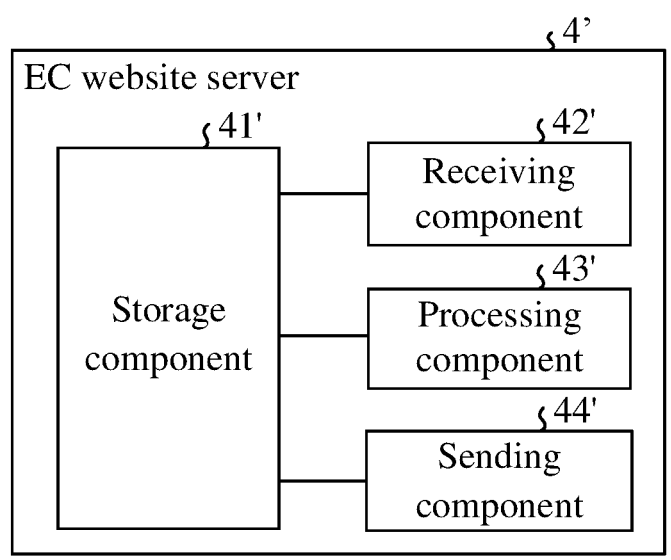
FIG. 16 shows a block diagram of an example of the partial structure of an EC website server in the third embodiment.

FIG. 16 shows a block diagram of an example of the partial structure of the EC website server 4' in the third embodiment. The EC website server 4' is a computer device for operating an EC website (online shop) on the Internet. The EC website server 4' sends an image of an item to the smartphone 1', for example, in accordance with an operation in the smartphone 1'.

The EC website server 4' includes a storage component 41', and furthermore, includes a receiving component 42', a processing component 43' and a sending component 44', as functional modules distinguished when the CPU executes specific programs stored in the storage component 41'.

The storage component 41' stores various information. The storage component 41' stores, for example, an item sales management DB. The receiving component 42' receives various information from external devices.

The processing component 43' executes various information processing. The sending component 44' sends various information to external devices.

Figure 17:
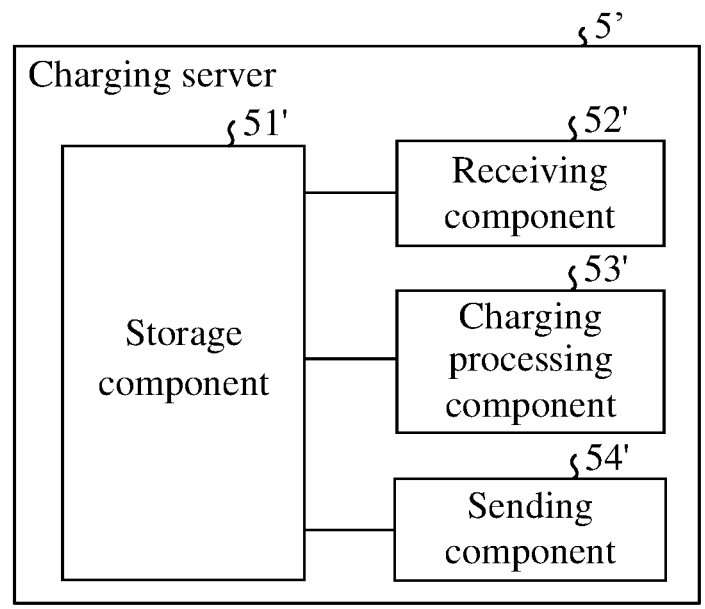
FIG. 17 shows a block diagram of an example of the partial structure of a charging server in the third embodiment.

FIG. 17 shows a block diagram of an example of the partial structure of the charging server 5' in the third embodiment. The charging server 5' includes a storage component 51', and furthermore, includes a receiving component 52', a charging processing component 53' and a sending component 54', as functional modules distinguished when the CPU executes programs stored in the storage component 51'.

The storage component 51' stores various information. The storage component 51' stores, for example, a charging management DB.

The receiving component 52' receives various information from external devices. The receiving component 52' receives the specified information related to the item being displayed in actual physical size, for example, from the display control server 3', etc. (details will be described later).

The charging processing component 53' performs charging processing based on the specified information, and registers the processing result in the charging management DB.

The sending component 54' sends various information to external devices. The sending component 54' sends, for example, the information in the charging management DB to external devices.

Figure 18A:
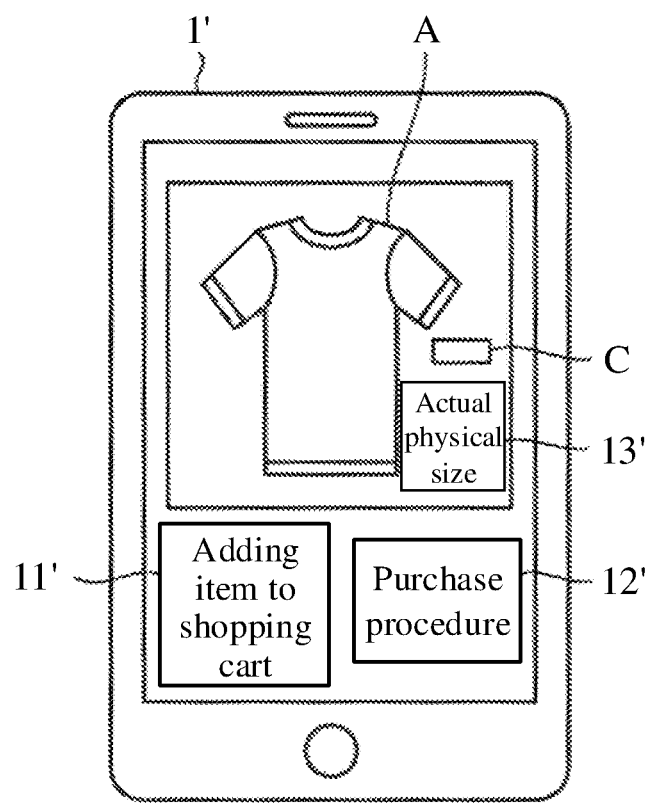
FIGS. 18A-18C show diagrams of examples of a display image in the third embodiment.
Figure 18B:
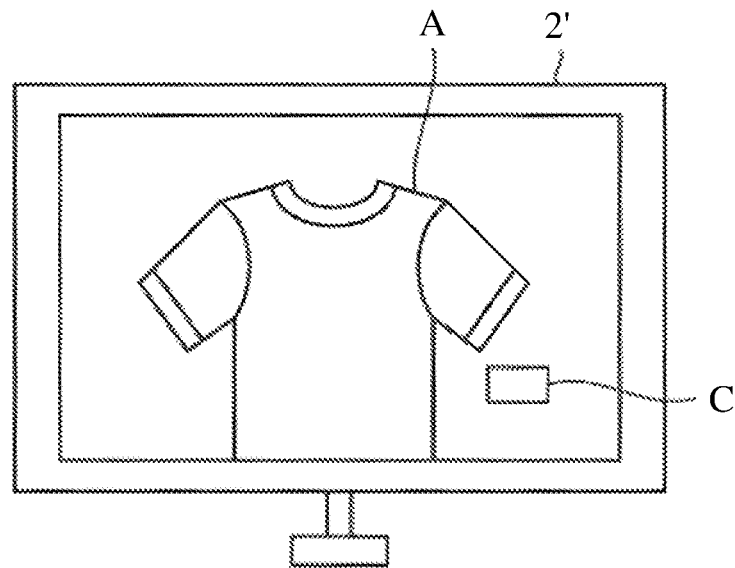
Figure 18C:
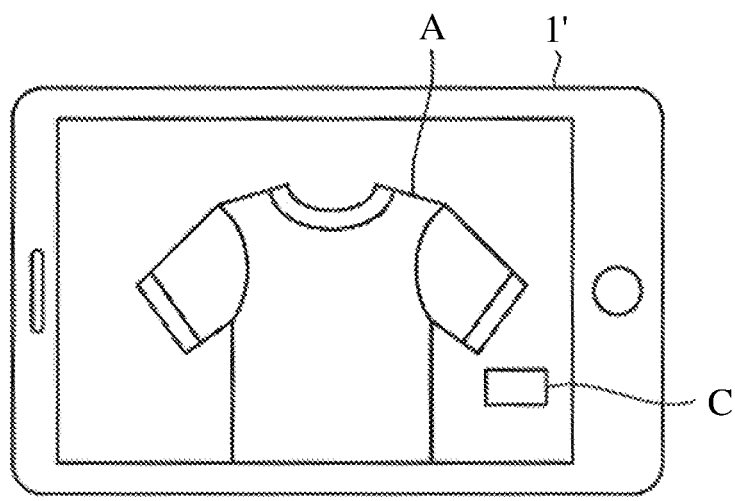

Hereinafter, an example where the item image is displayed in actual physical size as well as the actions of the structures in the system S' in this case will be described with reference to FIGS. 18A-C and subsequent figures. FIGS. 18A-C show diagrams of examples of a display image in the third embodiment. In FIG. 18A, the clothing A, as an item on the EC website, is presented on the screen of the smartphone 1'. In addition, the card C is presented near the clothing A.

The card C is, for example, a credit card in the international standard size. Thus, when photographing an image of an item sold on the EC website, the item is photographed together with the card C. In this way, in response to obtaining the image, the display control server 3' can perform the image conversion process for causing the image display component 233 of the television apparatus 2' to display the item in actual physical size based on the size of the card C in the image, the screen size and resolution of the television apparatus 2', etc.

On the screen of the smartphone 1', a button 13' for displaying the item in actual physical size is also displayed, in addition to a button 11' for adding an item to the shopping cart and a button 12' for performing the purchase procedure of the item. When the user operates the button 13', the television apparatus 2' displays the item in actual physical size.

FIG. 18B shows a scenario when the clothing A is displayed in actual physical size on the television apparatus 2' (image display component 233). By displaying the clothing A in actual physical size, the user can know the size of the clothing A, which is convenient for deciding whether to purchase or not.

Furthermore, as shown in FIG. 18C, the same image as that in the television apparatus 2' is also displayed on the smartphone 1'. Also, the user can change the image in the television apparatus 2' by operating the smartphone 1'.

Figure 19A:
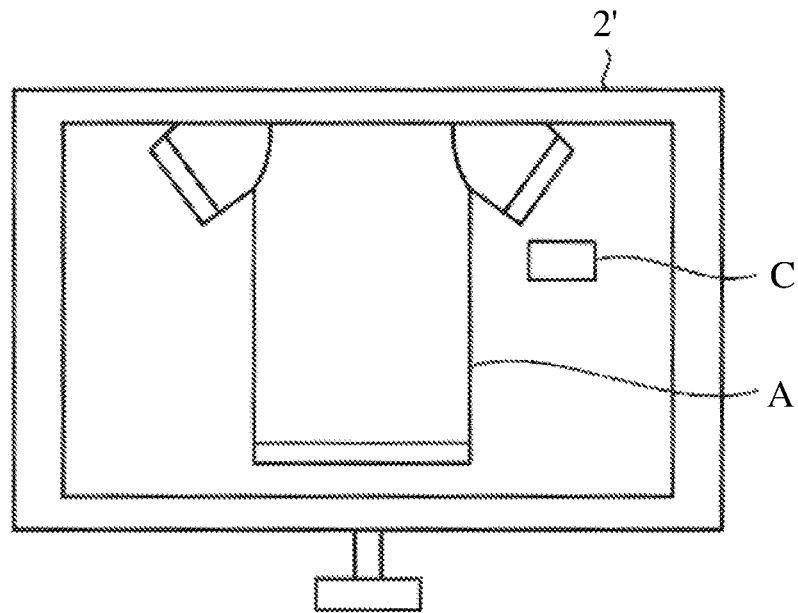
FIGS. 19A-19B show diagrams of examples of a display image in the third embodiment.
Figure 19B:
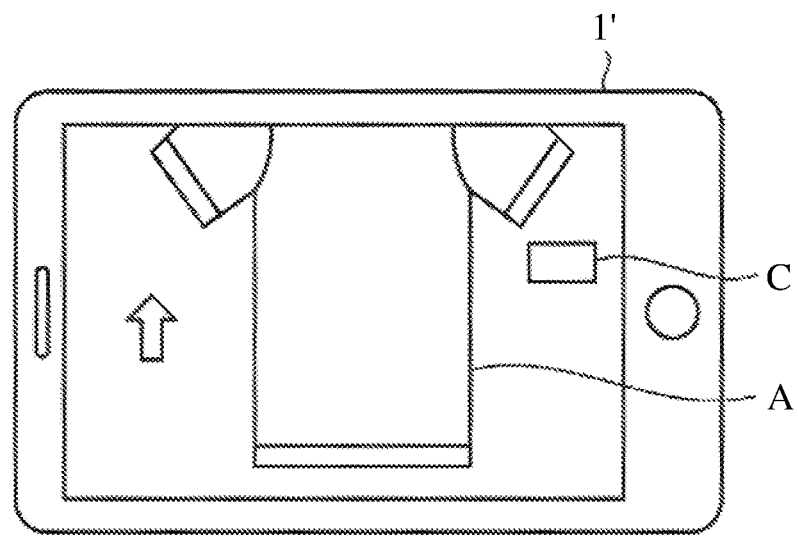

FIGS. 19A-19B show diagrams of examples of a display image in the third embodiment. When the user slides the screen to move the image of the clothing A upward on the screen of the smartphone 1' from the state of FIG. 18C, the image of the clothing A moves upward as shown in FIG.

19B. As a result, the image of the clothing A in the television apparatus 2' also moves upward (FIG. 18B→FIG. 19A). That is, for example, when the user wants to see the lower part of the image of the clothing A displayed in actual physical size on the television apparatus 2', the user can cause the image of the clothing A displayed in actual physical size on the television apparatus 2' to move upward by performing such an operation with the smartphone 1'.

Figure 20A:
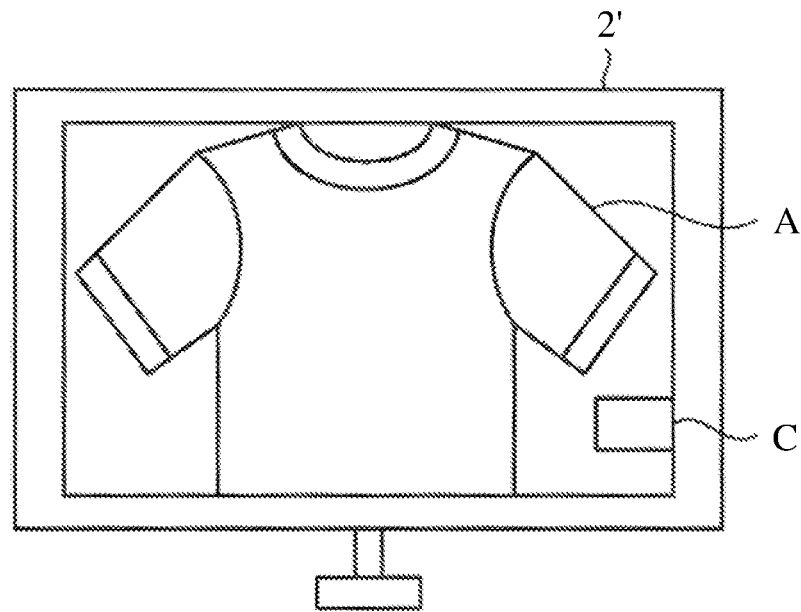
FIGS. 20A-20B show diagrams of examples of a display image in the third embodiment.
Figure 20B:
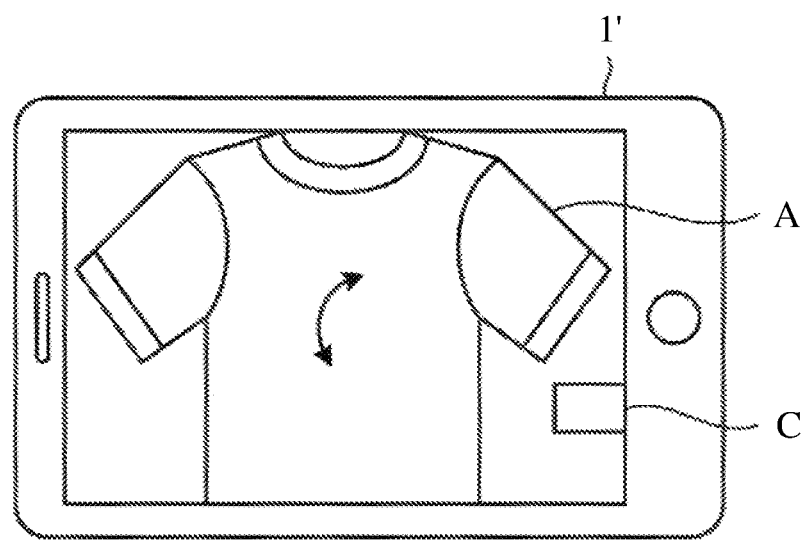

FIGS. 20A-B show diagrams of examples of a display image in the third embodiment. When the user uses an operation to zoom in the image of the clothing A on the screen of the smartphone 1' from the state of FIG. 18C, the image of the clothing A is enlarged as shown in FIG. 20B. As a result, the image of the clothing A in the television apparatus 2' is similarly enlarged (FIG. 18B→FIG. 20A). That is, for example, when the user wants to enlarge the image of the clothing A in actual physical size displayed on the television apparatus 2' to see the texture or others of the clothing A, the user can enlarge the image of the clothing A in actual physical size displayed on the television apparatus 2' by performing such an operation with the smartphone 1'. Furthermore, the same applies to a zoom out operation.

Figures 21, 22, 23:
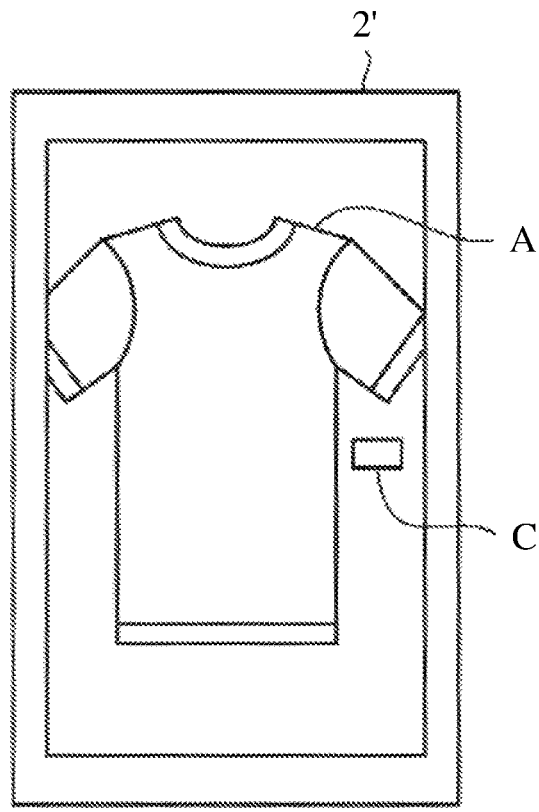
FIG. 21 shows a diagram of an example of a display image in the third embodiment.
FIG. 22 shows a diagram of an example of data in the third embodiment.
FIG. 23 shows a diagram of an example of data in the third embodiment.

FIG. 21 shows a diagram of an example of a display image in the third embodiment. As shown in FIG. 18B, when the lower part of the image of the clothing A is not presented on the screen of the television apparatus 2', the entire image of the clothing A can be presented on the screen for example by changing the orientation of the image of the clothing A with respect to the screen of the television apparatus 2' by 90 degrees. Such change in the orientation of the item may be performed automatically, or may be performed based on the user's operation on the smartphone 1'. It should be noted that the television apparatus 2' may be, for example, a television apparatus mounted on the wall in this case, but is not limited thereto.

FIG. 22 shows a diagram of an example of data in the third embodiment. Referring also to FIG. 1', when a request signal for displaying an item in actual physical size is sent from the smartphone 1' to the EC website server 4', for example, the image ID (Identifier) of the item, the EC website ID, and the identification information of the smartphone 1' (that is, terminal ID) as shown in FIG. 22 are included in the request signal and sent.

FIG. 23 shows a diagram of an example of data in the third embodiment. In order to display the item in actual physical size on the television apparatus 2', the display control server 3' stores, for example, at least the image data of the item, the EC website ID, the identification information of the smartphone 1' (that is, terminal ID), the identification information of the television apparatus 2' (that is, TVID), and the information on the screen size and resolution of the television apparatus 2' as shown in FIG. 23 correspondingly.

More specifically, the display control server 3' stores various information shown in FIG. 24 in the DB of the storage component 311' correspondingly, for example. FIG. 24 shows a diagram of an example of DB data in the third embodiment. In the DB, various information such as EC website name, EC website ID, terminal ID, terminal type (iOS/Android), log (history of display in actual physical size, etc.), TV manufacturer name, model name of television apparatus 2', TVID, picture size and resolution of television apparatus 2' is stored correspondingly.

Figure 25:
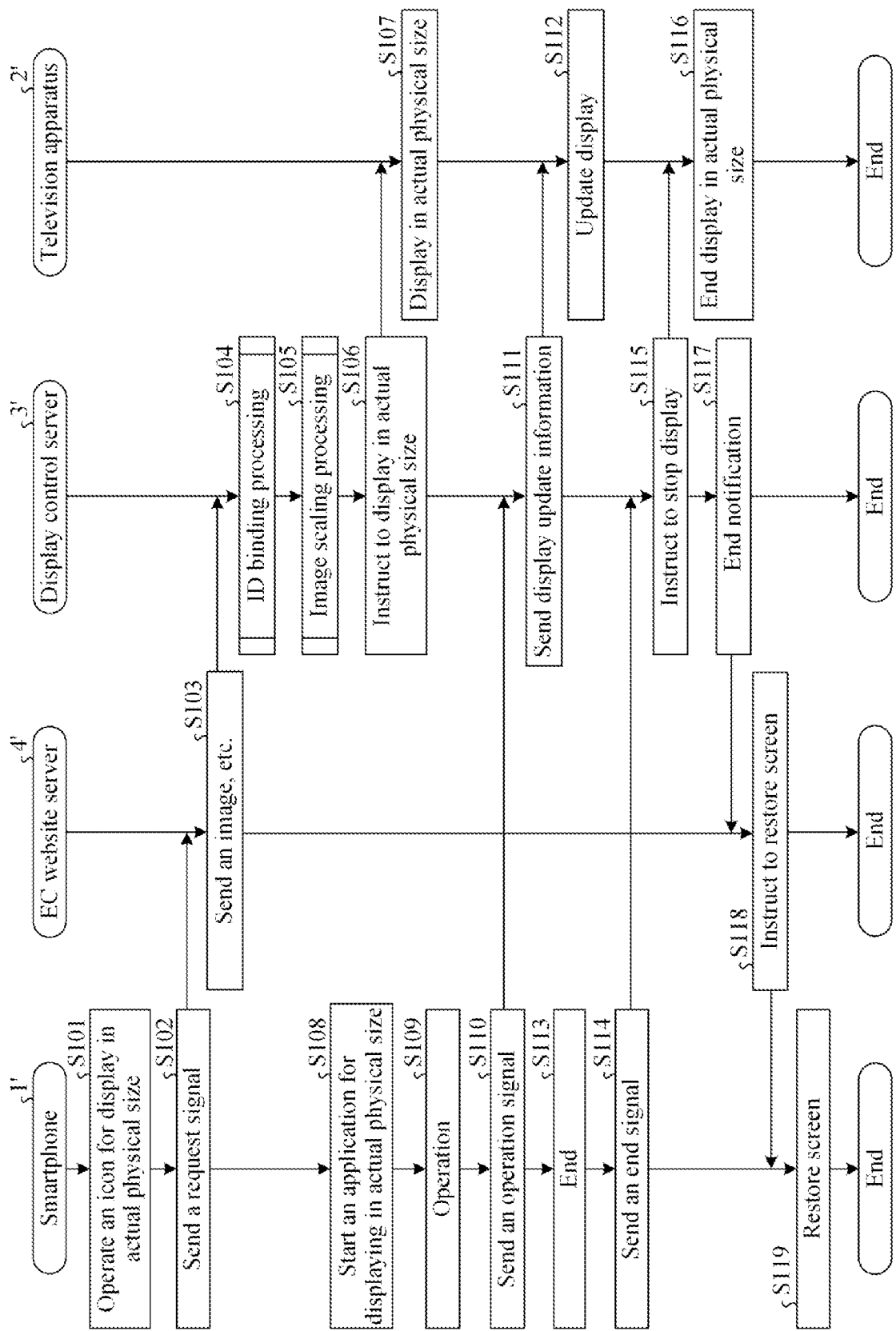
FIG. 25 shows a flowchart illustrating the overall processing in the system in the third embodiment.

Next, the processing flow of structures in the system S' will be described. FIG. 25 is a flowchart showing the overall processing in the system S in the third embodiment. Here, the flow begins from the scenario where a user views an image of an item on the EC website using the smartphone 1'.

When the button 13' (FIG. 18A) for displaying the item in actual physical size is operated by the user in S101, the smartphone 1' sends a request signal for displaying the item in actual physical size to the EC website server 4' in S102. The request signal includes, for example, various information such as image ID, EC website ID and terminal ID shown in FIG. 22.

In S103, the sending component 44' (FIG. 16) of the EC website server 4' sends the image data corresponding to the image ID, the EC website ID, the terminal ID and other information to the display control server 3'.

Figure 26:
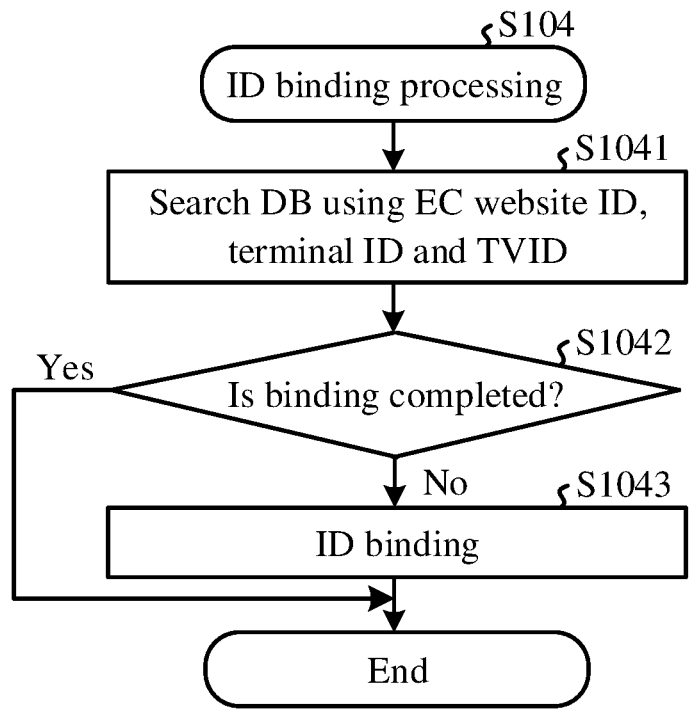
FIG. 26 shows a flowchart illustrating the binding processing in the third embodiment.

In S104, the display control server 3' performs ID binding processing. Here, FIG. 26 is a flowchart showing the ID binding processing in the third embodiment. In S1041, the DB management part 314' (FIG. 15) of the display control server 3' searches the DB of the storage component 311 (FIG. 24) using the EC website ID, the terminal ID and the TVID.

In S1042, the DB management part 314' determines whether the binding of the EC website ID, the terminal ID and the TVID is completed; if so, the flow goes to S1044; if not, the flow goes to S1043.

In S1043, the DB management part 314' updates the DB by binding the EC website ID, the terminal ID and the TVID.

Figure 27:
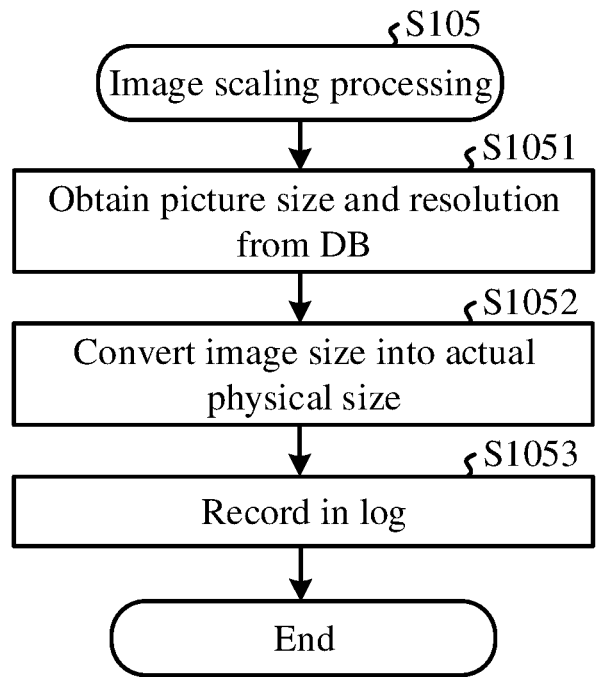
FIG. 27 shows a flowchart illustrating the image scaling processing in the third embodiment.

Returning to FIG. 25, after S104, the display control server 3' performs image scaling processing in S105. Here, FIG. 27 is a flowchart showing the image scaling processing in the third embodiment. In S1051, the display control component 313' (FIG. 15) of the display control server 3' obtains the information on the screen size and resolution of the television apparatus 2' from the DB (FIG. 24) of the storage component 311'.

In S1052, the display control component 313' converts the image size into actual physical size based on the size of the card C in the image, the screen size and resolution of the television apparatus 2', etc. In S1053, the DB management part 314' records the above-mentioned conversion in the log of the DB. Specifically, for example, the number of times of display in actual physical size is increased.

Returning to FIG. 25, after S105, the display control component 313' (FIG. 15) of the display control server 3' sends a request signal for instructing display in actual physical size to the television apparatus 2' in S106. The request signal includes the image data converted into the actual physical size, etc.

In S107, the display control component 244' (FIG. 13) of the television apparatus 2' causes the image of the item to be displayed in actual physical size on the image display component 233 (FIG. 2). It is noted that, for example, even when the television apparatus 2' is in the off state, it can also cause the television apparatus to turn on and display an item in actual physical size. In addition, for example, while the television apparatus 2' is displaying a television program or the like in the on state, the interruption process is performed to display an item in actual physical size.

After S108, the smartphone 1' starts an application for displaying in actual physical size. In this way, the smartphone 1' displays the same picture as the display in actual physical size that is being displayed on the television apparatus 2' (FIGS. 18B and 18C). When the user performs an operation such as sliding or zoom-in in S109, the smartphone 1' sends an operation signal to the display control server 3' in S110.

In S111, the display control component 313' (FIG. 15) of the display control server 3' sends the display update information to the television apparatus 2'. In S112, the display control component 244' of the television apparatus 2' updates the display of the image display component 233. Thereby, update about the display image in the smartphone 1' is synchronized with update about the display image in the television apparatus 2'.

When the user ends the processing in S113, the smartphone 1' sends an end signal to the display control server 3' in S114. In S115, the display control component 313' (FIG. 15) of the display control server 3' instructs the television apparatus 2' to stop the display.

In S116, the display control component 244' of the television apparatus 2' ends the display in actual physical size. In this case, for example, the display control component 244' returns the display on the image display component 233 to the state before starting to display the item in actual physical size.

In S117, the display control component 313' (FIG. 15) of the display control server 3' notifies the EC website server 4' of completion. In S118, the EC website server 4' instructs the smartphone 1' to perform the screen restoration. In S119, the smartphone 1' controls the screen to be in the state before the display in actual physical size is performed.

In this way, according to the system S' of the third embodiment, the image of the item being displayed on the smartphone 1' can be displayed in actual physical size on the television apparatus 2' with a larger screen. Therefore, for example in the case where the item is clothing, the user can easily compare the size of the clothing displayed in actual physical size with the size of his own clothing, thereby intuitively knowing the size. That is, a situation where the purchase fails because the size of the item does not match the image after purchase can be avoided.

In addition, the EC website is made easy to sell goods. For example, even if a user does not have the desire to purchase, the display of the item in actual physical size makes the user feel that "the failure of purchase due to the mismatch in size can be avoided", so that the potential purchase desire can be boosted, and thus it can be expected to guide the user to purchase goods. Furthermore, it is possible to prevent the EC website from receiving a complaint from a buyer that the size of the item does not match the image.

It should be noted that, regarding the charging related to the display in actual physical size performed by the charging server 5', for example, the following processing methods (1) to (9) are considered:

(1) Completely free.
(2) Free+Display ads.
(3) Free+Paid/No ads displayed.
(4) Charge for the purchased goods due to the display in actual physical size.
(5) Licensed sales of application for display in actual physical size. Sold-out charges are based on the number of smartphones downloading the application.
(6) Charge according to the number of times of display in actual physical size.
(7) Charge if the seller chooses the service of display in actual physical size.
(8) Buyer will be charged if the buyer performs the display in actual physical size.
(9) Receive a monthly fixed fee from the EC website operator.

In this way, it is possible to increase the profit based on the display of the item in actual physical size.

Fourth Embodiment

Next, the fourth embodiment will be described. The similar descriptions to those of the third embodiment are appropriately omitted. In the fourth embodiment, the difference from the third embodiment lies in that: the image conversion for display in actual physical size is performed using an application for display in actual physical size installed in the smartphone 1'. That is, the smartphone 1' includes, for example, an application for display in actual physical size that stores the correspondence information that establishes a correspondence between the identification information of the television apparatus 2' and the information on the screen size and resolution of the image display component 233 of the television apparatus 2'. Also, in response to obtaining a request signal (third request signal) for displaying an image of an item in actual physical size from the smartphone 1', the display control component 244' (FIG. 13) of the television apparatus 2' causes the image display component 233 to display the image of the item in actual physical size.

Figure 28:
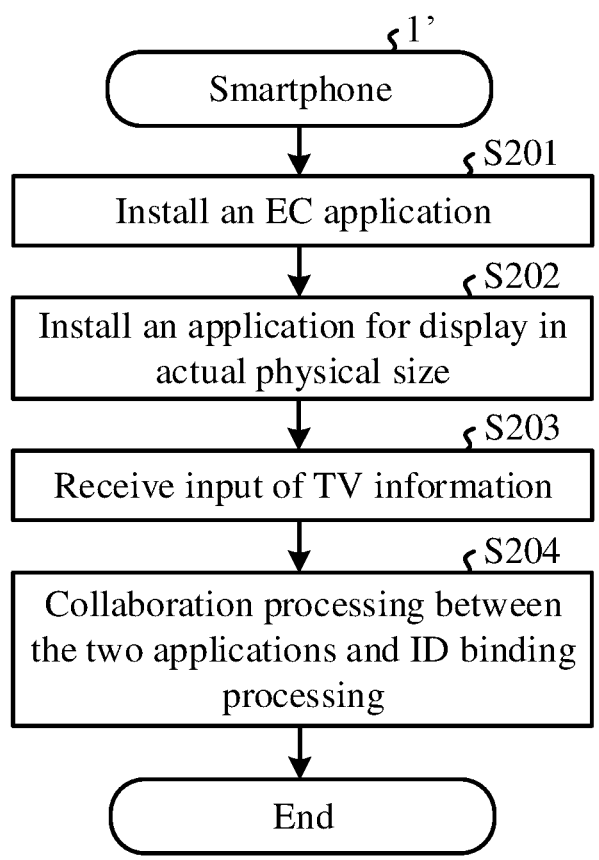
FIG. 28 shows a flowchart illustrating the preparation processing in a smartphone in a fourth embodiment.

FIG. 28 is a flowchart showing the preparation processing in the smartphone 1' in the fourth embodiment. In S201, the smartphone 1' installs an EC application. In S202, the smartphone 1' installs an application for display in actual physical size.

In S203, the smartphone 1' receives the input of the TV information (TV manufacturer name, model name, TVID, picture size, resolution, etc.). The input may be a text input in the smartphone 1', or may be an input performed by reading a two-dimensional barcode with the smartphone 1'.

In S204, the smartphone 1' performs the collaboration processing between the EC application and the application for display in actual physical size, and the ID binding processing (same as in FIG. 26).

Figure 29:
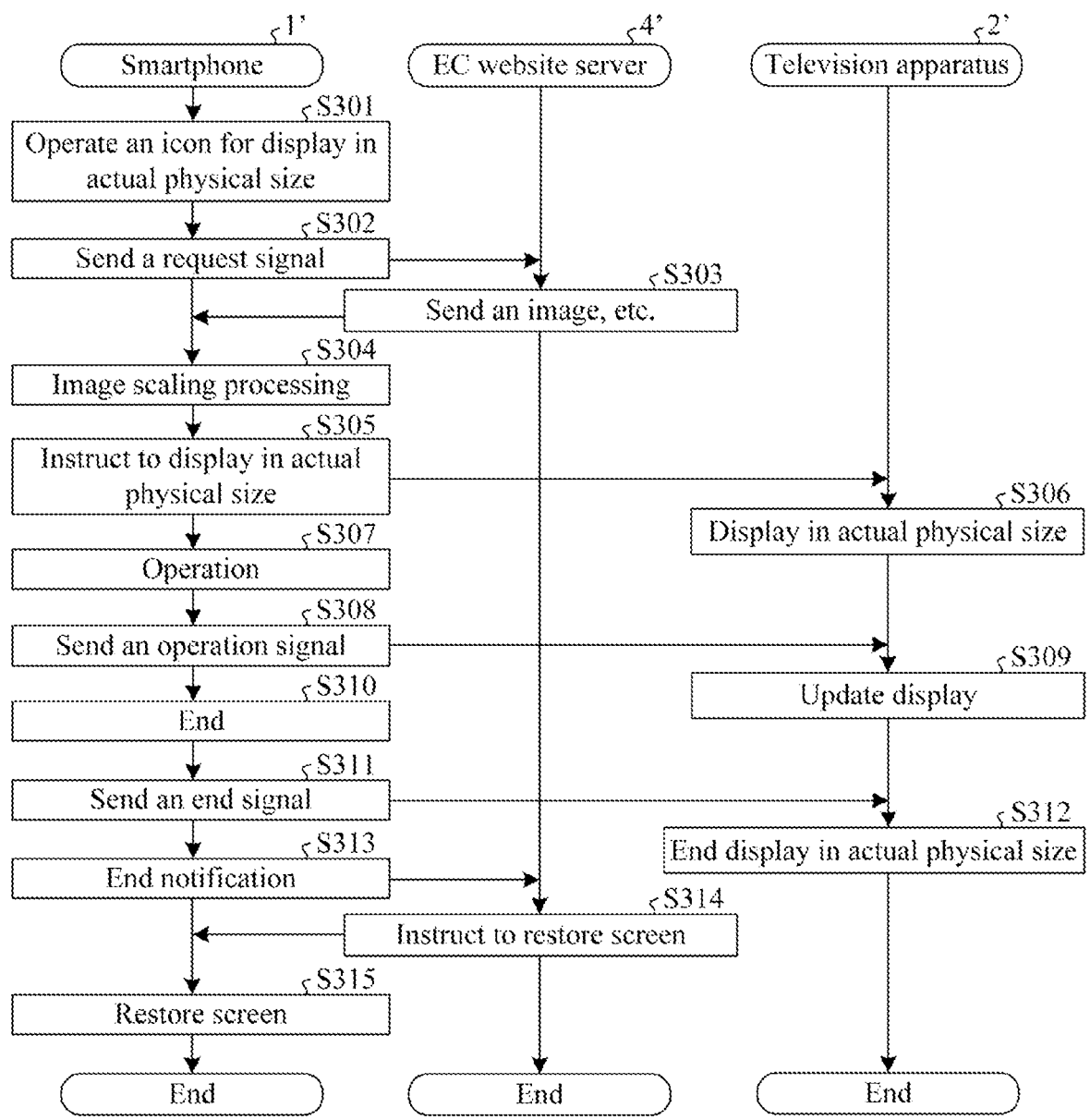
FIG. 29 shows a flowchart illustrating the overall processing in the system in the fourth embodiment.

Next, the processing flow of structures in the system S' will be described. FIG. 29 is a flowchart showing the overall processing in the system S' in the fourth embodiment. Here, the flow begins from the scenario where a user views an image of an item on the EC website using the smartphone 1'.

When the button 13' (FIG. 18A) for displaying the item in actual physical size is operated by a user in S301, the smartphone 1' sends a request signal for displaying the item in actual physical size to the EC website server 4' in S302. The request signal includes, for example, various information such as image ID, EC website ID and terminal ID shown in FIG. 22.

In S303, the sending component 44' (FIG. 16) of the EC website server 4' sends the image data corresponding to the image ID, the EC website ID, the terminal ID and other information to the smartphone 1'.

In S304, the smartphone 1' executes image scaling processing (same as in FIG. 27). In S305, the smartphone 1' sends a request signal for instructing to display in actual physical size to the television apparatus 2'. The request signal includes the image data converted into the size as large as the actual physical size of the item, etc.

In S306, the display control component 244' (FIG. 13) of the television apparatus 2' causes the image display component 233 (FIG. 2) to display the image of the item to be displayed in actual physical size. As display methods related to S305 and S306, for example, the television with a cast function based on Wi-Fi, Miracast, Chromecast, AirPlay, Wi-Di and the like can be listed, but not limited thereto.

It should be noted that the smartphone 1' displays the image same as the image displayed in actual physical size on the television apparatus 2' (FIGS. 18B and 18C). When the user performs an operation such as sliding or zoom-in operation in S307, the smartphone 1' sends an operation signal to the television apparatus 2' in S308.

In S309, the display control component 244' of the television apparatus 2' updates the display of the image display component 233. Thereby, the image displayed in the smartphone 1' is synchronized with the image displayed in the television apparatus 2'.

When the user performs the end operation in S310, the smartphone 1' sends an end signal to the television apparatus 2' in S311. In S312, the display control component 244' (FIG. 3) of the television apparatus 2' ends the display in actual physical size. In this case, for example, the display control component 244' restores the display on the image display component 233 to the state before starting to display the item in actual physical size.

In S313, the smartphone 1' notifies the EC website server 4' of completion. In S314, the EC website server 4' instructs the smartphone 1' to perform the screen restoration. In S315, the smartphone 1' controls the screen to be in the state before the display in actual physical size is performed.

Thus, according to the system S' of the fourth embodiment, the smartphone 1' directly communicates with the television apparatus 2', so that the television apparatus 2' can display the item in actual physical size.

VARIANT EMBODIMENT

In the third embodiment and the fourth embodiment, the display of the item image in actual physical size on the EC website is described, but it may be used in other scenarios. For example, it can also be applied in the following (11) to (21):
(11) Clothing (clothing sale store)
(12) Home Center
(13) Furniture store
(14) Second-hand goods sales (online auction)
(15) Pharmacy
(16) Medical treatment (online medical treatment)
(17) Bento Shop
(18) Handicraft store
(19) Watch/Jewelry store
(20) Printing (poster/flyer)
(21) Entertainment (games/comics, etc.)

For example, in (11) to (21), similar to the third and fourth embodiments, the image of the smartphone may be displayed in actual physical size on another computer device with a large screen, or it is also possible to display the image of the out-of-stock item in actual physical size or display the image of the item with color change in actual physical size in a store where goods are sold.

It should be noted that the programs or computer instructions executed by various devices (smartphone 1, smartphone 1', television apparatus 2, television apparatus 2', server for pushing and distribution 3, display control server 3', EC website server 4, EC website server 4', general-purpose server 5, charging server 5', measurement server 6) in various embodiments of the disclosure may be recorded in a recording medium (for example, non-volatile storage medium) that can be read by a computer device, such as CD (Compact Disc)-ROM (Read Only Memory), Floppy Disk (FD), CD-R (Recordable), DVD (Digital Versatile Disk) or the like, via files in the executable form. Furthermore, the programs or computer instructions may be provided or distributed via a network such as the Internet.

Several embodiments of the disclosure have been described, but these embodiments are presented as examples and are not intended to limit the scope of the disclosure. These new embodiments may be implemented in various other forms, and various omissions, substitutions and changes may be made without departing from the scope of the substance of the disclosure. These embodiments and variants thereof are included in the scope of the disclosure.

For example, instead of the smartphone, a tablet terminal, a touch notebook PC (Personal Computer), a monitor for a touch PC, or the like may be used. Furthermore, instead of the television apparatus 2, a digital display, a projector, a multi-picture display (for example, 4 pictures of 2×2, 9 pictures of 3×3, etc.), or the like may be used. In addition, the television apparatus in the above embodiments may also be an electronic apparatus that includes no display apparatus but has a function of outputting image signals to an external display apparatus, like a set-top box and a recorder.

Furthermore, in order to display in actual physical size, an object in the international standard size is photographed together with the item, but it is not limited thereto. For example, instead of photographing such an object in the international standard size, the image conversion may be performed based on the measurement value of a sensor that measures the distance from the camera to the item, for display in actual physical size. Furthermore, an AI (Artificial Intelligence) scaler may also be developed and used for display in actual physical size.

Furthermore, the target item is not limited to clothing, bag, etc., and all commodities are the objects of the disclosure.

Furthermore, in an image icon that can be enlarged and displayed by the television apparatus among the image icons displayed on the user terminal, a button for instructing the television apparatus to enlarge the display is provided on or near the image icon. Furthermore, the color, shape or display method of the enlarged and displayed image icon, so that it can be visually distinguished from other image icons that cannot be enlarged and displayed. Furthermore, when the user terminal instructs the television apparatus to enlarge the display, or when the display processing in the television apparatus is executed, an audio notification may be performed via the user terminal or the television apparatus.

What is claimed is:
1. A television apparatus, comprising:
a display, configured to display an image;
a communication interface configured to communicate with a mobile device and one or more servers, wherein the mobile device is configured to communicate with a first shopping website server of the one or more servers and comprises a camera, the one or more servers comprises a second server for pushing and distributing information to the display apparatus;
a controller in connection with the display and the communication interface and configured to:
receive authentication information from the second server, wherein the authentication information comprises URL information for determining the first shopping website server and an authentication code for authentication between the first shopping website server and the second server;
display the authentication information on the display of the display apparatus in order to allow the mobile device to scan the authentication code to access the first shopping website server based on the URL information for determining the first shopping website server and send the authentication code to the first shopping website server for authentication between the first shopping website server and the second server, to cause the second server generate a token and send the token to the first shopping website server;

receive a display request for displaying an item in actual physical size from the second server, wherein the display request is associated with a display request from the mobile device, the token and URL information for pointing to the item from the first shopping website server; and display the item in actual physical size on the display of the television apparatus.

2. The television apparatus according to claim 1, wherein the controller is further configured to:

receive image data of the item for displaying in actual physical size from the second server, wherein the image data is based on an image of the item sent from the first shopping website server.

3. The television apparatus according to claim 2, wherein the display request for displaying an item in actual physical size comprises screen size and resolution information of the display.

4. The television apparatus according to claim 3, wherein the image data of the item for displaying in actual physical size is generated according to an original copy of the item from the first shopping website server, the screen size and resolution information of the display.

5. The television apparatus according to claim 1, wherein the controller is further configured to:

upon receiving the display request for displaying the item in actual physical size, cause the television apparatus to turn on and display the item in actual physical size on the display.

6. The television apparatus according to claim 1, wherein the controller is further configured to:

upon receiving the display request for displaying the item in actual physical size, cause the display apparatus to start an interruption process to suspend a program currently displaying on the display and display the item in actual physical size on the display.

7. The television apparatus according to claim 6, wherein the controller is further configured to:

receive an end signal for terminating displaying the item in actual physical size, stop displaying the item and resume playing the program suspended on the display.

8. The television apparatus according to claim 1, wherein the display request from the mobile device is configured to request an image of the item shown in a size smaller than the actual physical size on the mobile device to display in actual physical size on the display of the television apparatus.

9. The television apparatus according to claim 8, wherein the controller is further configured to:

receive update display information of the item from the mobile device, wherein the update display information is triggered by an operation for the image of the item on the mobile device;

present update display information of the item in actual physical size on the display to synchronize updated presentation of the image of the item on the mobile device.

10. The television apparatus according to claim 9, wherein the controller is further configured to:

update presentation of the item to cause the item upward or downward on the display according to the update display information of the item.

11. The television apparatus according to claim 9, wherein the controller is further configured to:

enlarge the item on the display according to the update display information of the item.

12. The television apparatus according to claim 1, wherein the controller is further configured to:

display an international standard size object near the item in actual physical size on the display.

13. The television apparatus according to claim 1, wherein the controller is further configured to:

in response to the display request for displaying an item in actual physical size, start a browser in the television apparatus to display an image of the item based on the URL information for pointing to the item from the first shopping website server.

14. A display method on a television apparatus, wherein the television apparatus comprises: a display, configured to display an image; a communication interface configured to communicate with a mobile device and one or more servers, wherein the mobile device is configured to communicate with a first shopping website server of the one or more servers and comprises a camera, the one or more servers comprises a second server for pushing and distributing information to the display apparatus; wherein the method comprises:

receiving authentication information from the second server, wherein the authentication information comprises URL information for determining the first shopping website server and an authentication code for authentication between the first shopping website server and the second server;

displaying the authentication information on the display of the display apparatus in order to allow the mobile device to scan the authentication code to access the first shopping website server based on the URL information for determining the first shopping website server and send the authentication code to the first shopping website server for authentication between the first shopping website server and the second server, to cause the second server generate a token and send the token to the first shopping website server;

receiving a display request for displaying an item in actual physical size from the second server, wherein the display request is associated with a display request from the mobile device, the token and URL information for pointing to the item from the first shopping website server;

displaying the item in actual physical size on the display of the television apparatus.

15. The method according to claim 14, further comprising:

receiving image data of the item for displaying in actual physical size from the second server, wherein the image data is based on an image of the item sent from the first shopping website server.

16. The method according to claim 14, further comprising:

upon receiving the display request for displaying the item in actual physical size, causing the television apparatus to turn on and display the item in actual physical size on the display.

17. The method according to claim 14, further comprising:

upon receiving the display request for displaying the item in actual physical size, causing the display apparatus to start an interruption process to suspend a program currently displaying on the display and display the item in actual physical size on the display.

18. The method according to claim 14, wherein the display request from the mobile device is configured to request an image of the item shown in a size smaller than the actual physical size on the mobile device to display in actual physical size on the display of the television apparatus.

19. The method according to claim 18, further comprising:
- receiving update display information of the item from the mobile device, wherein the update display information is triggered by an operation for the image of the item on the mobile device;
- presenting update display information of the item in actual physical size on the display to synchronize updated presentation of the image of the item on the mobile device.

20. The method according to claim 19, further comprising:
- updating presentation of the item to cause the item upward or downward on the display according to the update display information of the item.

\* \* \* \* \*